US007215377B2

(12) United States Patent
Hoshino et al.

(10) Patent No.: US 7,215,377 B2
(45) Date of Patent: May 8, 2007

(54) IMAGE SIGNAL PROCESSING APPARATUS AND PROCESSING METHOD

(75) Inventors: Takaya Hoshino, Saitama (JP); Toshio Sarugaku, Chiba (JP); Ikuo Someya, Tokyo (JP); Makoto Kondo, Kanagawa (JP); Kazuhiko Nishibori, Kanagawa (JP); Koji Aoyama, Saitama (JP); Yukihiko Mogi, Kangawa (JP); Nobuo Ueki, Chiba (JP); Masuyoshi Kurokawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 517 days.

(21) Appl. No.: 10/498,426

(22) PCT Filed: Dec. 13, 2002

(86) PCT No.: PCT/JP02/13099

§ 371 (c)(1),
(2), (4) Date: Jun. 10, 2004

(87) PCT Pub. No.: WO03/055211

PCT Pub. Date: Jul. 3, 2003

(65) Prior Publication Data
US 2005/0062886 A1    Mar. 24, 2005

(30) Foreign Application Priority Data
Dec. 13, 2001    (JP)    ............................. 2001-380765

(51) Int. Cl.
*H04N 7/01*    (2006.01)

(52) U.S. Cl. ...................... 348/452; 348/459; 348/701; 348/441; 348/910; 348/700

(58) Field of Classification Search ................ 348/459, 348/452, 451, 441, 443, 447, 448, 699, 700, 348/701, 910, 911, 413.1, 416.1; 375/240.01, 375/240.16, 240.26; 382/236
See application file for complete search history.

(56) References Cited

U.S. PATENT DOCUMENTS
5,398,071 A * 3/1995 Gove et al. ................. 348/558
(Continued)

FOREIGN PATENT DOCUMENTS
EP    0 514 012    11/1992
(Continued)

*Primary Examiner*—David Ometz
*Assistant Examiner*—Jean W. Désir
(74) *Attorney, Agent, or Firm*—Frommer Lawrence & Haug LLP; William S. Frommer; Thomas F. Presson

(57) ABSTRACT

The present invention provides an image signal processing apparatus and a method thereof in which each of the fields forming the unit-frame is specified, with respect to the inputted image signal, based on a difference value calculated in signal level between a detected pixel in a current field and a detected pixel at the same position in a field which comes one frame behind the current field, a motion vector for a field which comes two frames behind the current field is detected, with respect to the detected pixel in the current field, the detected pixel is shifted, with respect to the specified first field, in a direction opposite to the motion vector within the range of the detected motion vector, the detected pixel is shifted, with respect to the specified fourth field, in a direction along the motion vector, and the detected pixels is shifted, with respect to the specified second and third fields, so as to make the pixels gradually closer to the pixel position shifted with respect to the fourth field, in the consecutive order of the fields from the first field, in the direction along the motion vector or in the direction opposite to the motion vector.

16 Claims, 18 Drawing Sheets

U.S. PATENT DOCUMENTS

| | | | |
|---|---|---|---|
| 5,410,356 A * | 4/1995 | Kikuchi et al. | 348/452 |
| 5,610,662 A * | 3/1997 | Hackett | 348/452 |
| 6,072,531 A * | 6/2000 | Shibano | 348/448 |
| 6,509,930 B1 * | 1/2003 | Hirano et al. | 348/452 |
| 6,636,267 B1 * | 10/2003 | Adachi | 348/448 |
| 6,704,463 B1 * | 3/2004 | Okada et al. | 382/300 |
| 6,876,367 B2 * | 4/2005 | Wada et al. | 345/690 |
| 6,885,705 B2 * | 4/2005 | Arita et al. | 375/240.16 |
| 6,947,094 B2 * | 9/2005 | Hoshino et al. | 348/441 |
| 6,990,148 B2 * | 1/2006 | Yang | 375/240.16 |
| 7,050,108 B2 * | 5/2006 | Nishibori et al. | 348/459 |
| 7,113,544 B2 * | 9/2006 | Tanase et al. | 375/240.16 |
| 7,133,453 B2 * | 11/2006 | Arita et al. | 375/240.16 |
| 2003/0227973 A1 * | 12/2003 | Nishibori et al. | 375/240.16 |
| 2005/0012856 A1 * | 1/2005 | Aoyama et al. | 348/459 |
| 2005/0012857 A1 * | 1/2005 | Aoyama et al. | 348/459 |
| 2005/0264692 A1 * | 12/2005 | Hoshino et al. | 348/452 |

FOREIGN PATENT DOCUMENTS

| | | | |
|---|---|---|---|
| EP | 1351494 A2 * | 10/2003 | |
| EP | 1460845 A1 * | 9/2004 | |
| EP | 1460847 A1 * | 9/2004 | |
| JP | 61-26382 | 2/1986 | |
| JP | 3-165190 | 7/1991 | |
| JP | 4-227180 | 8/1992 | |
| JP | 5-137122 | 6/1993 | |
| JP | 6-500910 | 1/1994 | |
| JP | 8-84293 | 3/1996 | |
| JP | 10-501953 | 2/1998 | |
| JP | 11-196383 | 7/1999 | |
| JP | 11-298861 | 10/1999 | |
| JP | 2001-169252 | 6/2001 | |

* cited by examiner

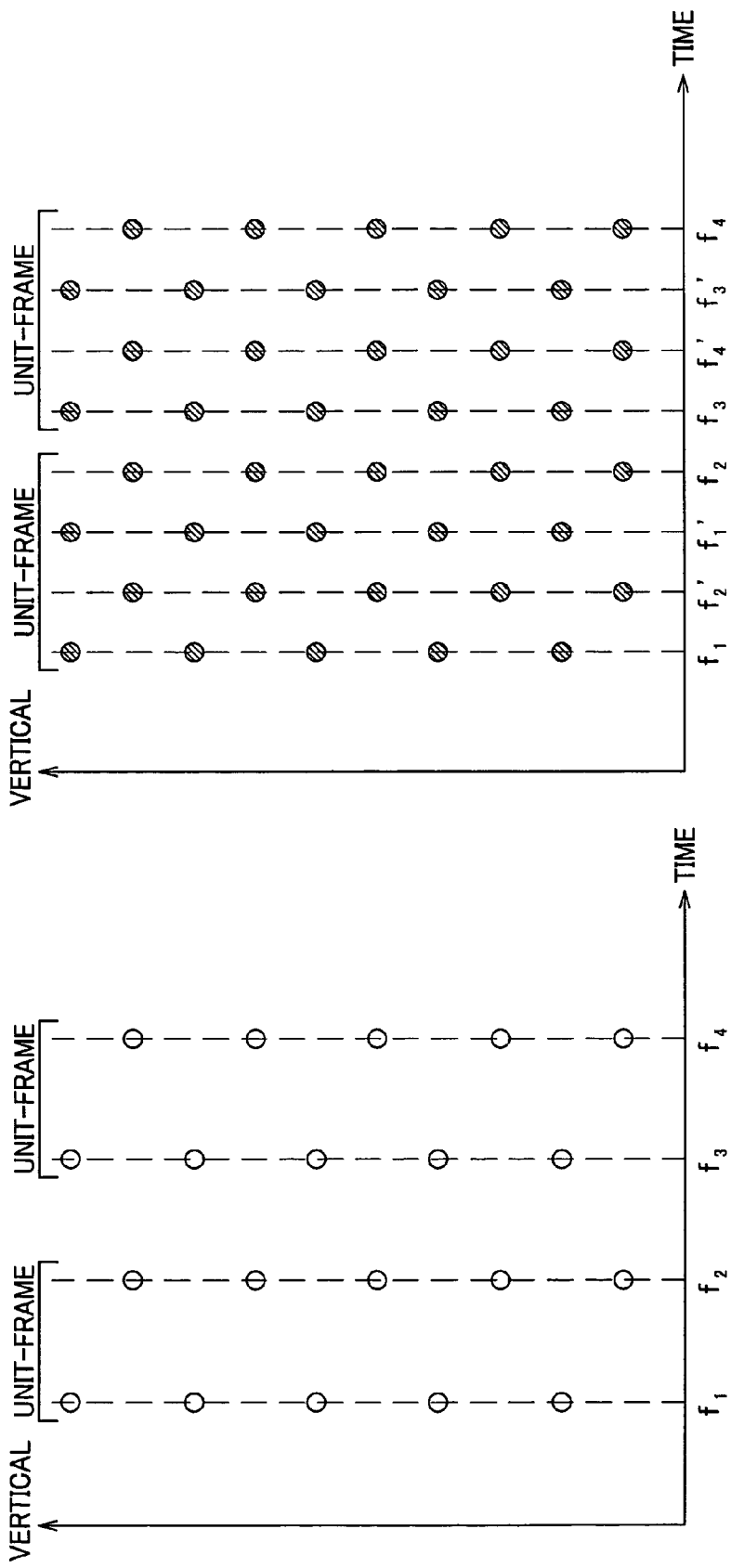

IMAGE SIGNAL PROCESSING APPARATUS AND PROCESSING METHOD

TECHNICAL FIELD

The present invention relates to an image signal processing apparatus which shifts the position of each detected pixel of image signals which are generated by performing double-speed conversion on images subjected to telecine conversion and consist of unit-frames each formed of 4 fields, and an image processing method thereof.

This application is based upon and claims the benefit of priority from the prior Japanese Patent Application No. 2001-380765 filed Dec. 13, 2001, the entire contents of which are incorporated herein by reference.

BACKGROUND ART

As a conventional scanning system used for TV broadcasting, an interlace scanning system which scans every other horizontal scanning lines has been widely used. In this interlace scanning system, every frame image is formed of a field image consisting of odd-numbered scanning lines and a field image consisting of even-numbered scanning lines, to suppress screen flicker disturbance which causes the entire screen to flicker, thus preventing deterioration of the screen quality.

The interlace scanning system has been adopted as a standard system for television in countries throughout the world. For example, according to PAL (Phase Alternation by Line) system in European television broadcasting, the field frequency is 50 Hz (frame images: 25 frame/second, field images: 50 fields/second).

In particular, the PAL system conventionally adopts a double-speed field frequency system in which the field frequency of inputted image signals is converted to be doubled from 50 Hz to 100 Hz, by performing an interpolation processing or the like, expecting further suppression of the screen flicker disturbance.

FIG. 1 is a block diagram showing a double-speed field conversion circuit 5 using the double-field-frequency system. The double-speed field conversion circuit 5 is integrated in a television receiver 6 which has an input terminal 61, a horizontal/vertical deflection circuit 62, and a CRT 63. This double-speed field conversion circuit 5 has a double-speed converter 51, and a frame memory 52.

The double-speed converter 51 writes image signals of 50 fields/second according to the PAL system inputted from the input terminal 61 into the frame memory 52. Also, the double-speed converter 51 reads the image signals written in the frame memory 52, at a speed twice higher than the writing speed. Thus, the frequency of the image signals of 50 fields/second is converted to a double frequency, so that image signals of 100 fields/second can be generated.

The double-speed converter 51 outputs the image signals subjected to the double conversion to the CRT 63. The CRT 63 displays the inputted image signals on the screen. Horizontal and vertical deflection of the image signals in the CRT 63 is controlled based on a horizontal/vertical rectangular wave which is generated by the horizontal/vertical deflection circuit 62 and has a frequency which is twice that of the inputted image signals.

FIGS. 2A and 2B show a relationship between each field and pixel positions with respect to image signals before and after the double-speed conversion. In each figure, the abscissa axis represents time, and the ordinate axis represents the position of each pixel in the vertical direction. The image signals indicated by white circle marks in FIG. 2A are interlace image signals of 50 fields/second before the double-speed conversion, and the image signals indicated by black circle marks in FIG. 2B are interlace image signals of 100 fields/second after the double-speed conversion.

In the image signals shown in FIG. 2A, fields $f_1$ and $f_2$ are signals generated from one single unit-frame of a film. Likewise, fields $f_3$ and $f_4$ constitute one single unit-frame. Since these image signals are interlace image signals, the pixel positions in the vertical direction differ between adjacent fields. Therefore, it is impossible to create a new field between every two adjacent fields, maintaining the characteristics of interlacing.

Hence, as shown in FIG. 2B, two fields $f_2'$ and $f_1'$ are newly generated between the fields $f_1$ and $f_2$. No new fields are generated between the fields $f_2$ and $f_3$ but two new fields $f_4'$ and $f_3'$ are generated between the fields $f_3$ and $f_4$. That is, one unit-frame is formed of four fields forming two frames.

In some cases, those newly generated fields $f_1'$, $f_2'$, ... are obtained by using a median filter or the like, supposing that each pixel value is an intermediate value among three pixels surrounding each pixel. The newly generated fields $f_1'$, $f_2'$, ... have the same contents as the fields $f_1$, $f_2$, ..., respectively.

Specifically, the double-speed field conversion circuit 5 provides parts in each of which two new fields are generated and parts in each of which no new fields are generated, alternately among fields of image signals before the double-speed conversion. The number of screen images per unit time can thus be increased so that the screen flicker disturbance as previously described can be suppressed.

In order to watch a cinema film consisting of still images of 24 unit-frames/second on an ordinary TV set, television-to-cinema conversion (which will be hereinafter referred to as telecine conversion) is carried out to attain interlace television signals. FIGS. 3A and 3B show a relationship between each field and an image position in case where an image moves in the horizontal direction, with respect to the image signals after the telecine conversion. The abscissa axis represents the position of the image in the horizontal direction, and the ordinate axis represents time. In the image signals before the double-speed conversion shown in FIG. 3A, the fields $f_1$ and $f_2$ form one single unit-frame, so that the image is displayed at the same position. This image moves in the horizontal direction (to the right side) as the field shifts to the field $f_3$. Since the field $f_4$ forms part of the same unit-frame as the field $f_3$, the image is displayed at the same position as in the field $f_3$.

If image signals shown in FIG. 3A after the telecine conversion are subjected to the double-speed conversion according to the double-speed field frequency system, as shown in FIG. 3B, an equal image is displayed at an equal position in the fields $f_1$, $f_2'$, $f_1'$, and $f_2$ forming one single unit-frame. Similarly, as equal image is displayed at an equal position in the fields $f_3$, $f_4'$, $f_3'$ and $f_4$ forming one single unit-frame.

The image signals subjected to the double-speed conversion after the telecine conversion are displayed at one equal position from the field $f_1$ to the field $f_2$ as shown in FIG. 3B. On the other side, the signals greatly move in the horizontal direction when the field shifts from $f_2$ to $f_3$. In particular, the image signals after the double-speed conversion form fields regularly at a cycle of one field per 1/100 second. Therefore, a time band in which an image moves is shorter than another time band in which an image stands still. When a program is actually watched by a CRT, motions of images look discontinuous. To eliminate such discontinuity in motions, for example, a screen image is divided into blocks each consisting of predetermined pixels, based on a block matching method, and a motion vector is obtained by evaluating similarity in units of blocks. The motion is corrected by shifting pixel positions for every block in accordance with the obtained motion vector.

Suppose, however, a case that motions take place in two directions on a television screen T, as shown in FIG. 4. That is, an image A of an object moves to the left side in the direction of an arrow $X_1$ in the figure while a background B moves to the right side in the direction of an arrow $X_2$ in the figure. In this case, the direction of a motion vector as described above cannot be detected correctly, and therefore, the discontinuity in motions of images as described above cannot be eliminated. The reference symbol C in FIG. 4 denotes a block to perform the block matching described above.

DISCLOSURE OF THE INVENTION

An object of the present invention is to provide a novel image signal processing apparatus and a method thereof capable of solving problems involved by an image signal processing apparatus as described above and the method thereof in which double-speed conversion is performed on images subjected to telecine conversion.

Another object of the present invention is to provide an image signal processing apparatus and a method thereof capable of smoothening motions while suppressing screen flicker disturbance, with respect to image signals generated by performing double-speed conversion on images subjected to telecine conversion, even in images of wide variations such as an image which includes motions in two directions in one single block.

According to the present invention, there are provided an image signal processing apparatus and a method thereof, in which image signals which are generated by performing double-speed conversion on images subjected to telecine conversion and consist of unit-frames each formed of four fields are inputted, and the respective fields are specified on the basis of calculated difference values in pixel signal levels. The positions of detected pixels are shifted such that the pixel position in the first field thus specified is shifted in a direction opposite to a motion vector, the pixel position in the fourth field also specified is shifted in the motion vector, and the pixel positions in the second and third fields also specified are shifted to be gradually closer to the pixel position shifted in the fourth field as the fields come later from the first field.

Specifically, an image signal processing apparatus according to the present invention is inputted with an image signal which is generated by performing double-speed conversion on an image subjected to telecine conversion and which is formed of unit-frames each including four fields of first and successive second to fourth fields, each of the unit-frame staring from the first field, comprising: a sequence detector which calculates a difference value in signal level between a detected pixel in a current field and a detected pixel at the same position in a field which comes one frame behind the current field, with respect to the inputted image signal, and specifies each of the fields forming the unit-frame, based on the difference value; a motion vector detector which detects a motion vector for a field which comes two frames behind the current field, with respect to the detected pixel in the current field; and an image controller which shifts the positions of the detected pixels of the image signal within the fields specified by the sequence detector, respectively, in accordance with a vector quantity of the motion vector, wherein the image controller shifts the detected pixel, with respect to the specified first field, in a direction opposite to the motion vector, the image controller shifts the detected pixel, with respect to the specified fourth field, in a direction along the motion vector, and the image controller shifts the detected pixels, with respect to the specified second and third fields, so as to make the pixels gradually closer to the pixel position shifted with respect to the fourth field, in the consecutive order of the fields from the first field, in the direction along the motion vector or in the direction opposite to the motion vector.

Specifically, an image signal processing method according to the present invention comprises the steps of: inputting an image signal which is generated by performing double-speed conversion on an image subjected to telecine conversion and which is formed of unit-frames each including four fields of first and successive second to fourth fields, each of the unit-frame staring from the first field; specifying each of the fields forming the unit-frame, with respect to the inputted image signal, based on a difference value calculated in signal level between a detected pixel in a current field and a detected pixel at the same position in a field which comes one frame behind the current field; detecting a motion vector for a field which comes two frames behind the current field, with respect to the detected pixel in the current field; shifting the detected pixel, with respect to the specified first field, in a direction opposite to the motion vector; shifting the detected pixel, with respect to the specified fourth field, in a direction along the motion vector; and shifting the detected pixels, with respect to the specified second and third fields, so as to make the pixels gradually closer to the pixel position shifted with respect to the fourth field, in the consecutive order of the fields from the first field, in the direction along the motion vector or in the direction opposite to the motion vector.

The above and other objects, advantages and features of the present invention will be more apparent from the following description taken in conjunction with the accompanying drawings in which:

BRIEF DESCRIPTION OF THE DRAWINGS

FIGS. 2A and 2B show a relationship between each field and pixel positions with respect to image signals before and after the double-speed conversion;

BEST MODE FOR CARRYING OUT THE INVENTION

An embodiment of the present invention will now be described in details with reference to the drawings.

The present invention is applied to an image signal processing apparatus built in a television receiver according to PAL system (Phase Alternation by Line).

Figure 1:
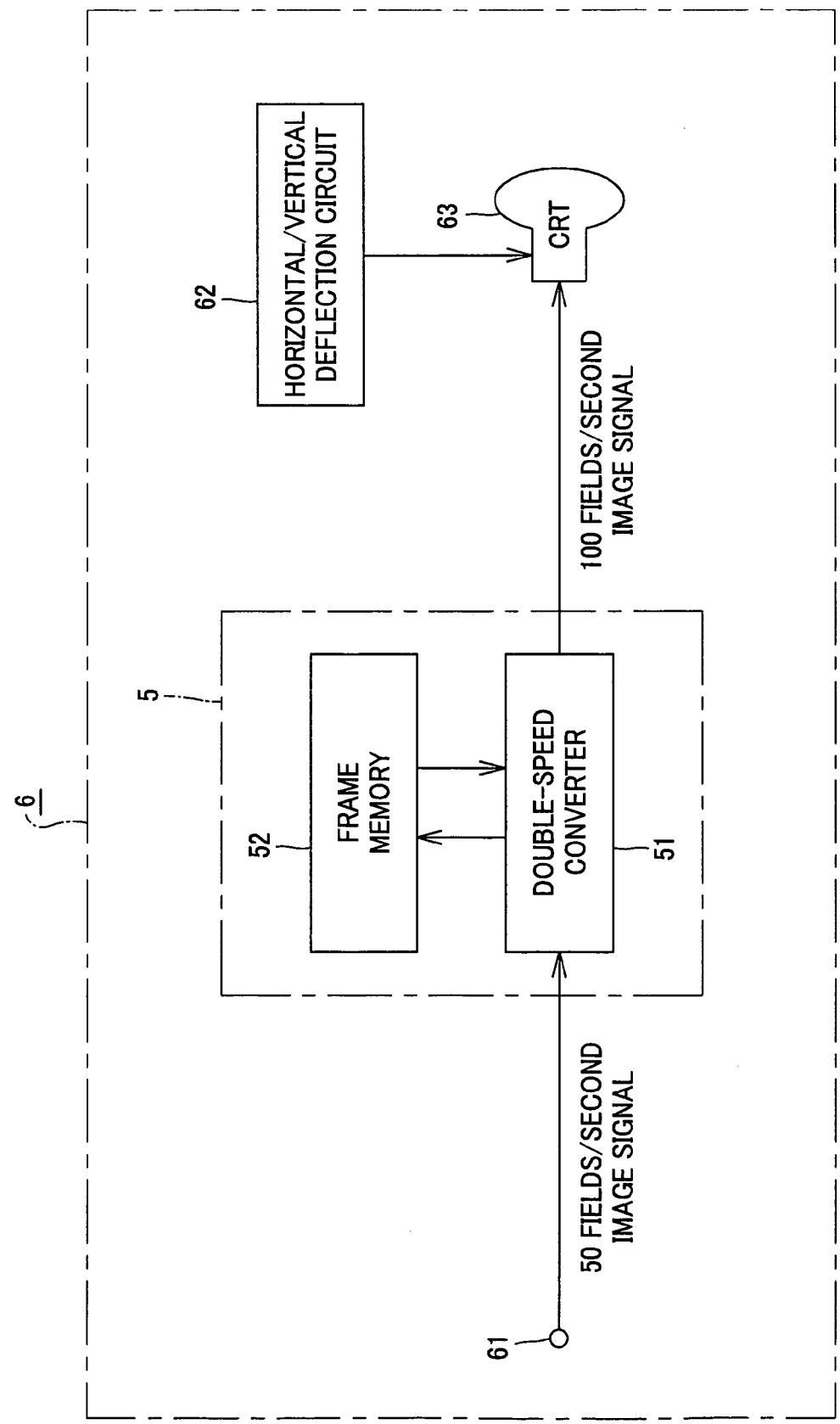
FIG. 1 is a block diagram showing a double-speed field conversion circuit to which a double-speed field frequency system is applied.
Figure 3B:
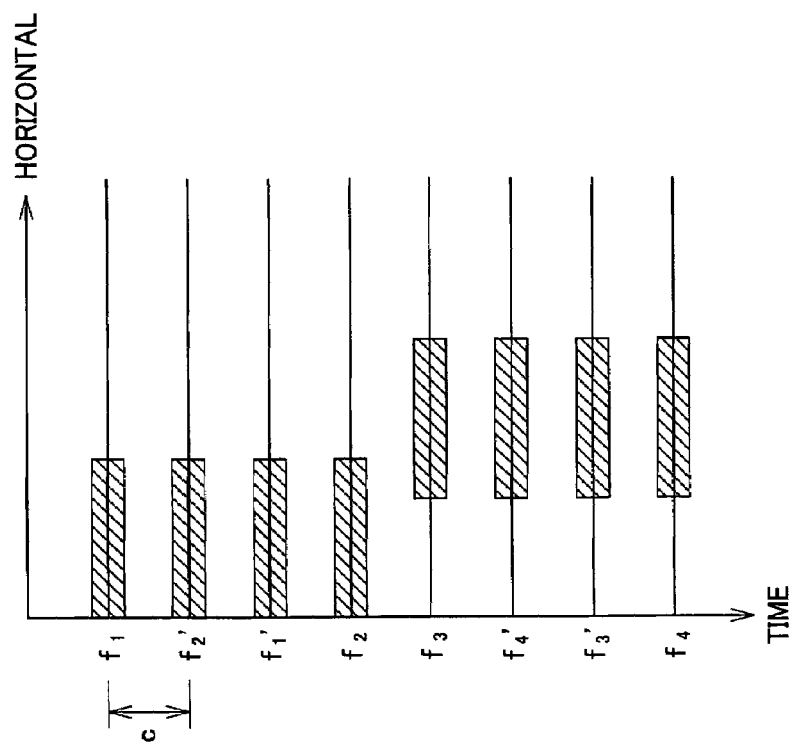
FIGS. 3A and 3B show a relationship between each field and an image position in case where an image moves in the horizontal direction.
Figure 3A:
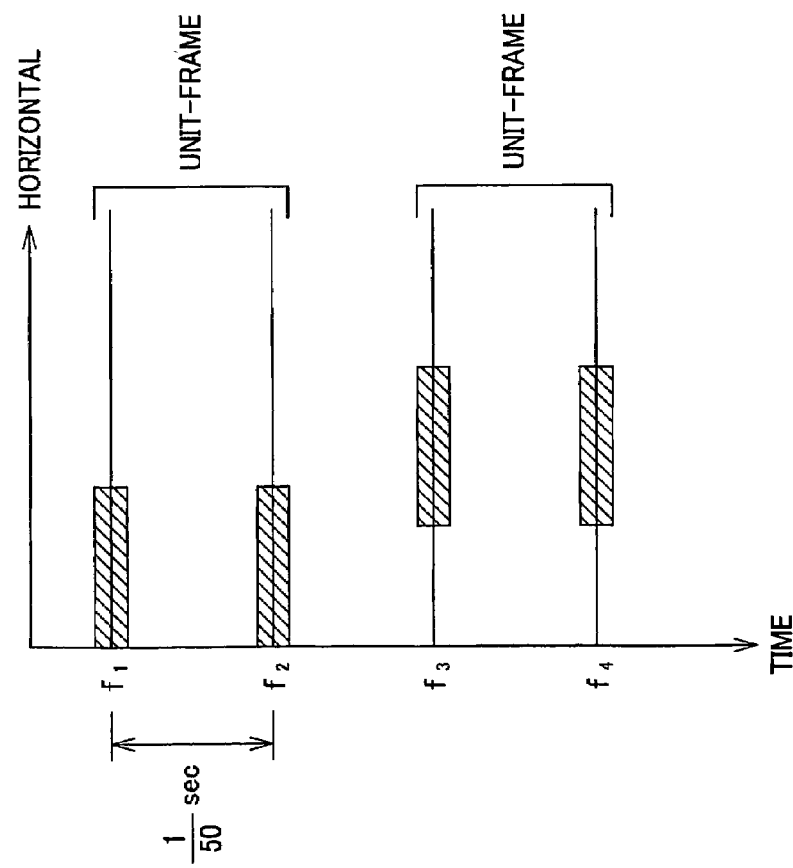
Figure 4:
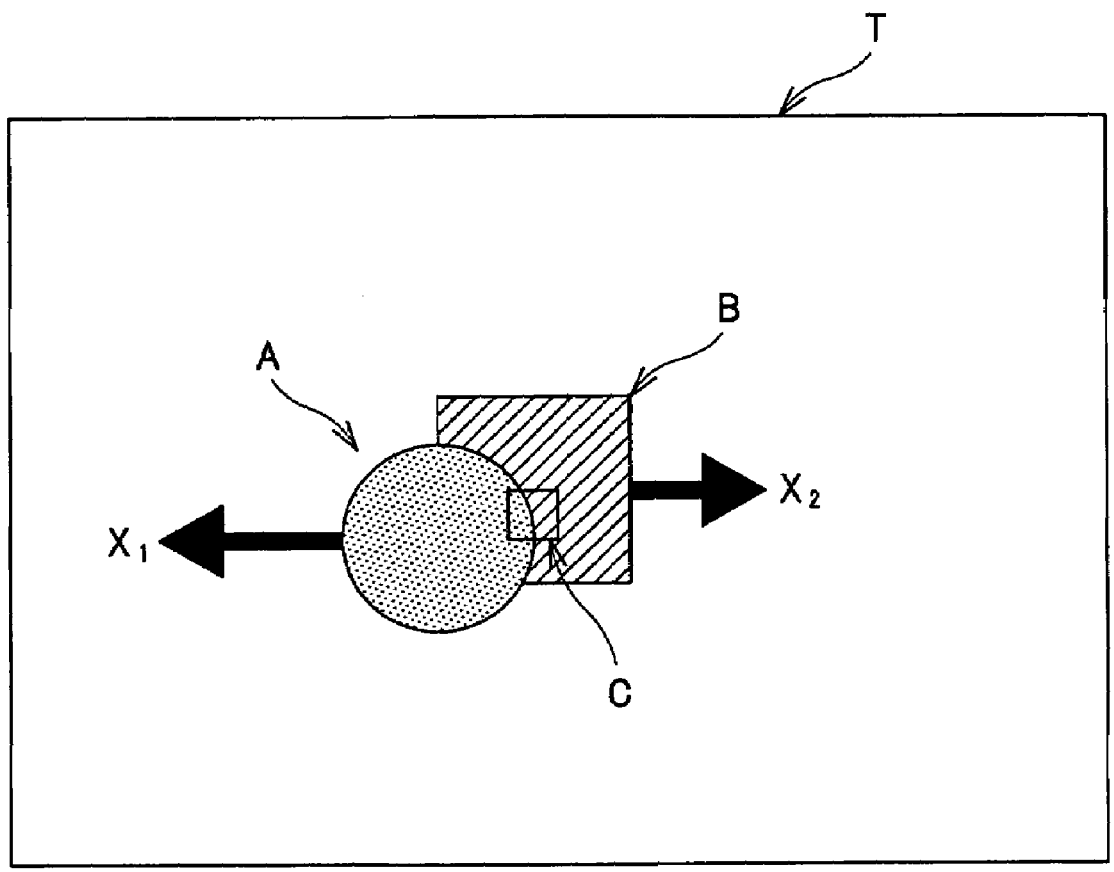
FIG. 4 is a view for explaining an image of a variation in which one single block includes motions in two directions.
Figure 5:
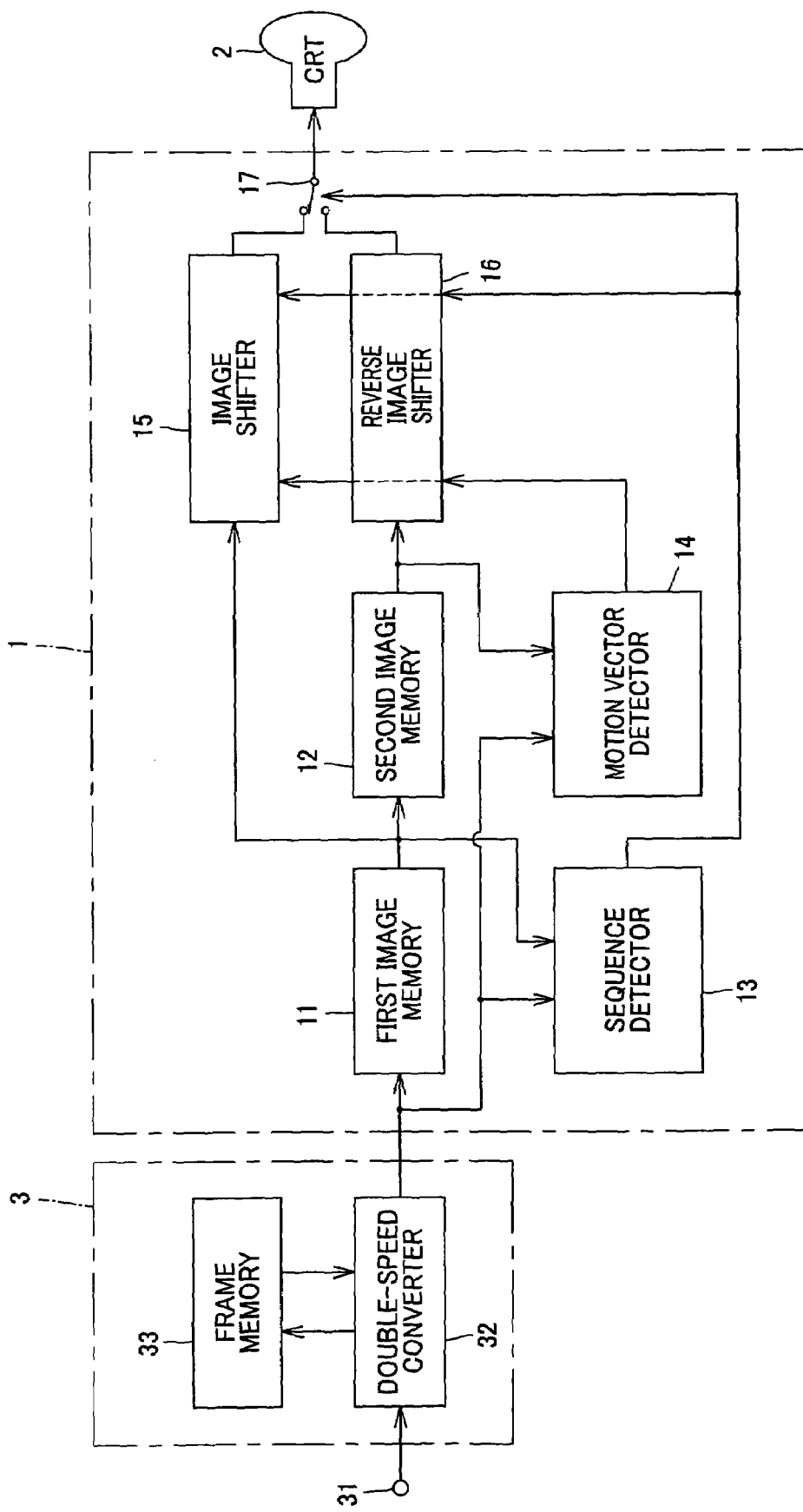
FIG. 5 is a partial block circuit diagram showing an image signal processing apparatus to which the present invention is applied.

An image signal processing apparatus 1 to which the present invention is applied has a structure as shown in FIG. 5.

The image signal processing apparatus 1 has a first image memory 11, a second image memory 12, a sequence detector 13, a motion vector detector 14, an image shifter 15, a reverse image shifter 16, and a switch 17, as shown in FIG. 5.

The first image memory 11 is sequentially supplied with interlace image signals of, for example, 100 fields/second which are generated by performing double-speed conversion on images subjected to telecine conversion and have a unit-frame formed of 4 fields.

The first image memory 11 stores the supplied image signals for every frame, in units of fields. That is, the image signals are outputted from the first image memory 11 after one frame after the image signals were supplied to the first image memory 11.

The second image memory 12 has the same internal structure as the first image memory 11 and stores the image signals supplied from the first image memory 11 for every one frame, in units of fields. That is, the image signals are outputted from the second image memory 12 one frame after the image signals were supplied to the second image memory 12, i.e., two frames after the image signals were supplied to the first image memory 11. The image signals stored in the second image memory 12 are supplied to the motion vector detector 14.

The sequence detector 13 detects the image signals supplied to the first image memory 11 and the image signals outputted from the first image memory 11, and compares image signal levels for every pixel, to calculate a difference value between the supplied and outputted signals. That is, the sequence detector 13 compares the image signal levels for each pixel at one single part of a screen, at cycles of frames. The sequence detector 13 transmits the calculation result concerning the difference value of the image signal levels to the image shifter 15 and the reverse image shifter 16.

The motion vector detector 14 detects the image signals supplied to the first image memory 11 and the image signals outputted from the second image memory 12, and detects a motion vector based on, for example, the block matching method. In this block matching method, the screen is divided into blocks each consisting of predetermined pixels, and motion vectors are obtained by evaluating similarity in units of blocks. The motion vector detector 14 transmits a motion vector detected for every pixel or for every block, to the image shifter 15 and the reverse image shifter 16.

The image shifter 15 receives the result of comparing the pixel signal levels from the sequence detector 13. The image shifter 15 also receives the motion vector detected by the motion vector detector 14. Further, the image shifter 15 is supplied with image signals delayed by one frame from the inputted image signals, from the first image memory 11. The image shifter 15 shifts each pixel position of the supplied image signals in the vector direction of the received motion vector within the range of the received motion vector.

The reverse image shifter 16 receives the result of comparing the pixel signal levels from the sequence detector 13. The reverse image shifter 16 receives the motion vector detected by the motion vector detector 14. Further, the reverse image shifter 16 is supplied with image signals delayed by one frame from the inputted image signals, from the first image memory 11. The reverse image shifter 16 shifts each pixel position of the supplied image signals in the direction opposite to the received motion vector. Note that the reverse image shifter 16 is applicable even in the case where the reverse image shifter 16 is integrated with the image shifter 15.

The image shifter 15 and reverse image shifter 16 supply the switch 17 with those image signals that have pixel positions having been shifted in units of fields. Based on the result of comparing pixel signal levels supplied from sequence detector 13, the switch 17 selects necessary image signals in units of fields. The image signals selected by the switch 17 are outputted to the CRT 2. The CRT 2 displays the image signals inputted from the switch 17, on the screen, and controls deflection of the image signals in horizontal and vertical directions, based on a horizontal/vertical deflection circuit not shown.

In some cases, a double-speed field conversion circuit 3 which performs double-speed conversion on the field frequency of image signals may be integrated in the image signal processing apparatus 1. The double-speed field conversion circuit 3 is integrated to prevent screen flicker disturbance by improving the resolution. For example, a processing such as interpolation is performed in the PAL system, to convert image signals having a field frequency of 50 Hz into image signals having a double frequency which is 100 Hz.

The double-speed field conversion circuit 3 has an input terminal 31 connected to the television receiver, a double-speed converter 32, and a frame memory 33, as shown in FIG. 5.

The double-speed converter 32 writes images signals after the telecine conversion, which are inputted through the input terminal 31 from the television receiver, into the frame memory 33. The double-speed converter 32 reads the image signals written into the frame memory 33, at a speed which is twice the writing speed. As a result, for example, the frequency of the image signals of 50 fields/second according to the PAL system is converted to a double frequency, so that image signals of 100 fields/second can be generated. The double-speed converter 32 supplies the image signal processing apparatus 1 with the image signals subjected to the double-speed conversion.

Figure 6B:
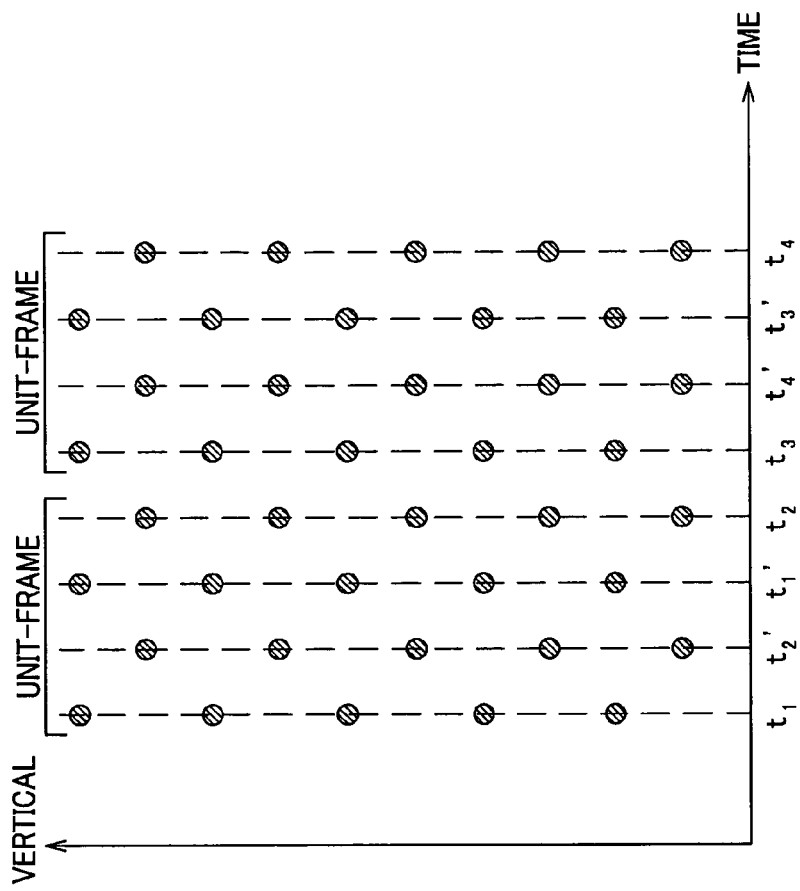
FIGS. 6A and 6B show a relationship between each field and pixel positions before and after double-speed conversion in the double-speed field conversion circuit.
Figure 6A:
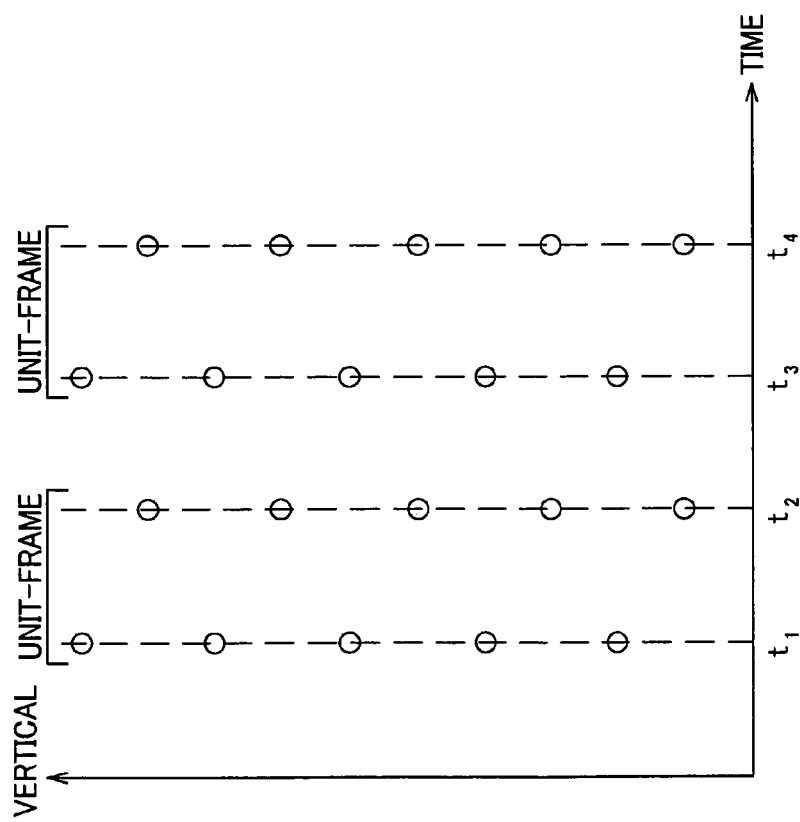

FIGS. 6A and 6B show a relationship between each field and pixel positions before and after the double-speed conversion in the double-speed field conversion circuit 3. In the figures, the abscissa axis represents time and the ordinate axis represents the position of each pixel in the vertical direction.

The image signals before the double-speed conversion are interlace image signals of 50 fields/second according to the PAL system, and every unit-field is formed of two fields, as shown in FIG. 6A.

On the other side, the image signals after the double-speed conversion are interlace image signals of 100 fields/second. Therefore, as shown in FIG. 6B, new two fields $t_2'$ and $t_1'$ are generated between fields $t_1$ and $t_2$. No fields are generated between fields $t_2$ and $t_3$ but new two fields $t_4'$ and $t_3'$ are generated between fields $t_3$ and $t_4$. Therefore, in the image signals, every unit-frame is formed of four fields.

In some cases, those newly generated fields $t_1'$, $t_2'$, ... are obtained by using a median filter or the like, supposing that each pixel value is an intermediate value among three pixels surrounding each pixel. The newly generated fields $t_1'$, $t_2'$, ... have the same contents as the fields $t_1$, $t_2$, ..., respectively. The newly generated fields $t_1'$, $t_2'$, ... have the same contents as the fields $t_1$, $t_2$, ..., respectively. As a result of this, every unit-frame is formed of four fields, so that the resolution can be improved by increasing the number of screens per unit time. Accordingly, the screen flicker disturbance can be suppressed.

Next, the operation of the image signal processing apparatus 1 according to the present invention will be described.

Figure 7:
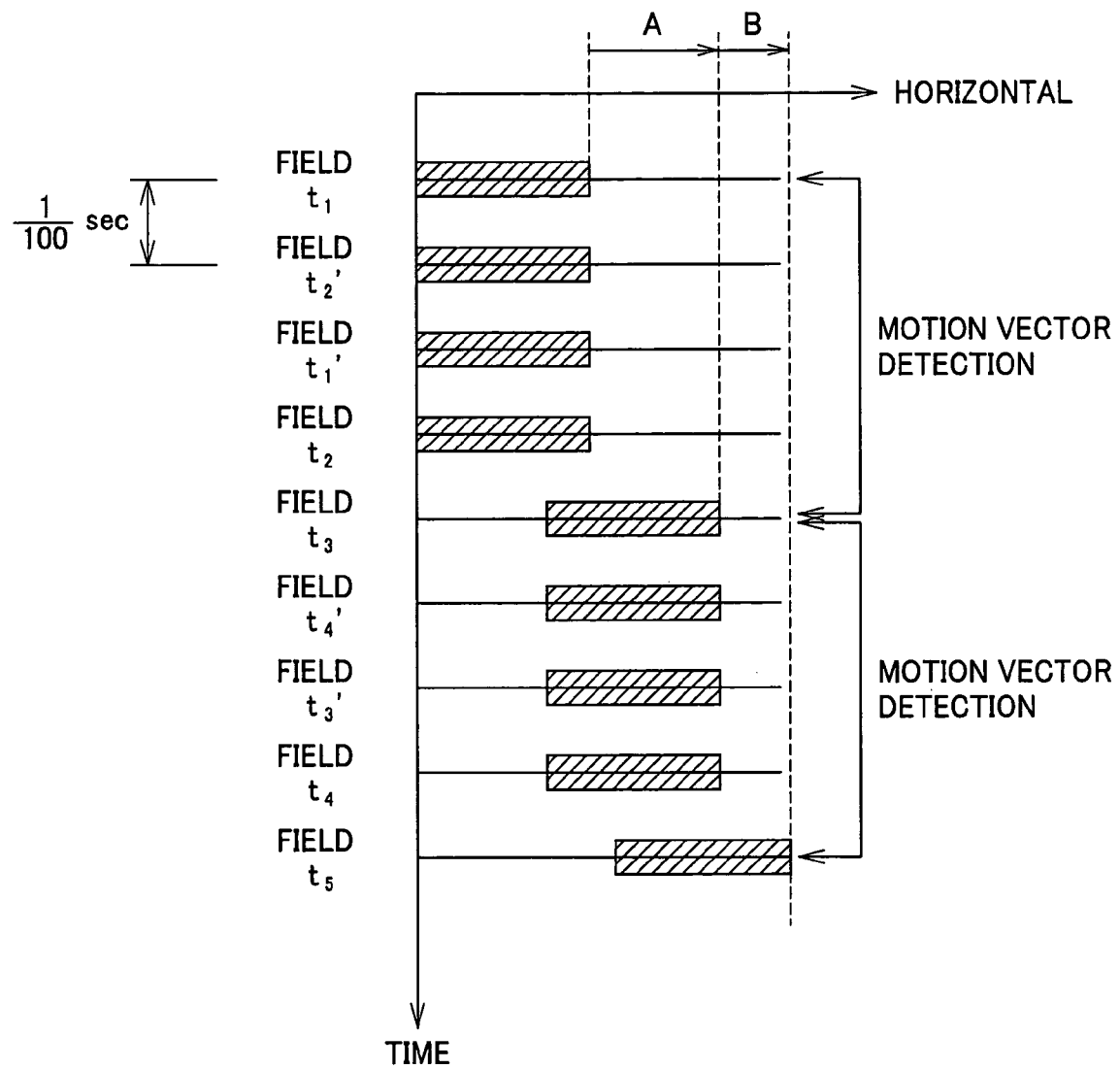
FIG. 7 shows a relationship between each field and an image position in case where an image moves in the horizontal direction.

The image signal processing apparatus 1 is sequentially supplied with image signals subjected to double-speed conversion after telecine conversion and consisting of unit-frames each formed of four fields, from the double-speed field conversion circuit 3. FIG. 7 shows a relationship between each field and an image position in case where an image moves in the horizontal direction of the image signal. In FIG. 7, the abscissa axis represents the position of the image in the horizontal direction, and the ordinate axis represents time. Images already subjected to the telecine conversion are supplied to the first image memory 11 at a constant time cycle, in the order of fields $t_1$, $t_2'$, $t_1'$ and $t_2$, and the images are all displayed on one equal position. As the field shifts to $t_3$, the image shifts in the horizontal direction (to the right side), and the images are supplied to the first image memory 11 in the order of fields $t_3$, $t_4'$, $t_3'$ and $t_4$.

When, for example, the field $t_3$ is supplied to the first image memory 11 (hereinafter referred to as a reference field), the field $t_1$ which precedes by two frames the reference field is outputted from the second image memory 12 (hereinafter referred to as a two-frame-delayed field).

The motion vector detector 14 detects a motion vector between the reference field and the two-frame-delayed field in units of pixels or blocks. In case of the example shown in FIG. 7, the vector direction of the motion vector is the horizontal direction (to the right side) with the two-frame-delayed field taken as a reference, and has a vector quantity of A. Similarly, when the reference field is the field $t_5$, the two-frame-delayed field is $t_3$ and the vector mount of the motion vector is B. By repeating this procedure, the directions and quantities of vectors can be sequentially obtained taking each two-frame-delayed field as a reference. The motion vector detector 14 sequentially transmits the obtained vector directions and quantities to the image shifter 15 and reverse image shifter 16.

The sequence detector 13 sequentially detects the reference fields and those fields each of which precedes by one frame the reference field outputted from the first image memory 11 (hereinafter referred to as one-frame-delayed field), and calculates difference values in pixel signal levels at an equal pixel position.

Figure 8:
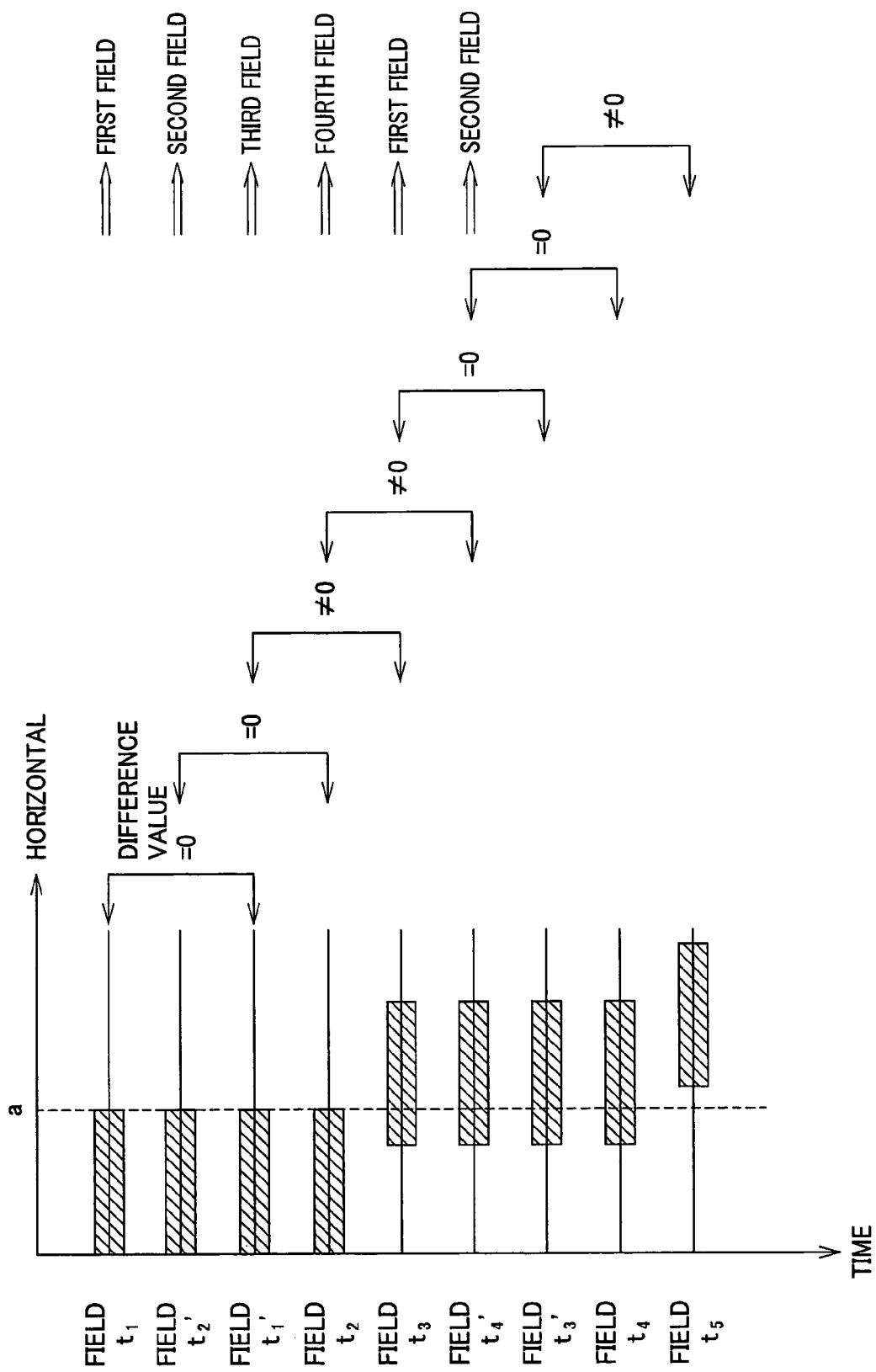
FIG. 8 is a view for explaining a method of detecting a sequence by a sequence detector.

More specifically, as shown in FIG. 8, the reference field $t_1'$ and the one-frame-delayed field $t_1$ form one single unit-frame, so that the difference value in pixel signals levels, for example, at a pixel position a is 0. Next, the field $t_2$ is supplied as the reference field, and then, the field $t_2'$ becomes the one-frame-delayed field. Therefore, the difference value in pixel signal levels at a pixel position a is 0, too.

Next, the field $t_3$ is supplied as the reference field, and then, the one-frame-delayed field is $t_1'$. Since both of these field respectively form parts of different unit-frames, the difference value in pixel signal levels at the point a is not 0 (but will be 1 hereinafter). Next, $t_4'$ is supplied as the reference field, and then, the field $t_2$ becomes the one-frame-delayed field, so that the difference value in pixel signal levels at the point a is 1, too.

Further, $t_3'$ is supplied as the reference field, and then, the one-frame-delayed field is $t_3$. Since both of these fields form one equal unit-frame, the difference value in pixel signal levels at the point a is 0 again. This tendency applies to reference fields supplied thereafter. The calculated difference values of "0011" repeat in this order at a cycle of four fields. Hence, it is possible to specify relationships of each field to preceding and following fields, by detecting the sequence for every unit of four fields.

Where this tendency is observed with respect to the one-frame-delayed fields, the difference values are "0011" in the order from the first field of every unit-frame. Therefore, when the difference value "0" is calculated at first, the one-frame-delayed field detected at this time is specified as the first field of a unit-frame (hereinafter referred to as the first field), as shown in FIG. 8. When the difference value "0" continues, the one-frame-delayed field detected at this time is specified as the second field. When 1 is calculated at first to be the difference value, the one-frame-delayed field detected at this time is specified as the third field. When the difference value "1" continues, the one-frame-delayed field detected at this time is specified as the fourth field.

The sequence detector 13 transmits the results of specifying the relationships of each field to preceding and following fields, to the image shifter 15 and reverse image shifter 16.

The image shifter 15 and reverse image shifter 16 shift the positions of detected pixels of the supplied image signals, in the vector directions, based on the relationships of each field to preceding and following fields specified by the sequence detector 13. Which of the first to fourth fields each field corresponds to has been found out before the image signals are supplied to the image shifter 15. Therefore, the positions of detected pixels can be shifted correctly and easily.

With respect to the shift direction of each field, the image signal is shifted in the direction opposite to the motion vector in each first field, and the image signals is shifted in the direction along the motion vector in each of the second and later fields, as indicated by black arrows in FIG. 9. In the second and later fields, the shift amount is increased gradually from the second field within the vector quantity of each motion vector, so that the shift amount in the fourth field is the greatest. That is, in the present invention, the fields are shifted in the directions along motion vectors and in the opposite directions of motion vectors, balanced between each other, so that the shift amount is suppressed in the fourth field in which the shift amount is maximum, to reduce errors in detecting motion vectors.

The errors in detecting motion vectors mean those cases in which the directions of the detected motion vectors are wrong, for example, when an image includes motions in two directions in one single block (e.g., an image of an object moves in the leftward direction while the background moves in the rightward direction). For example, in an example of motion correction in which the image signal in every field is shifted only in the vector direction of the motion vector, as indicated by dotted arrows in FIG. 9, the shift amount itself becomes excessive in the fourth field. If the direction of a detected motion vector is wrong, the error appears emphasized on the screen because the image is moved greatly in the fourth field.

Figure 9:
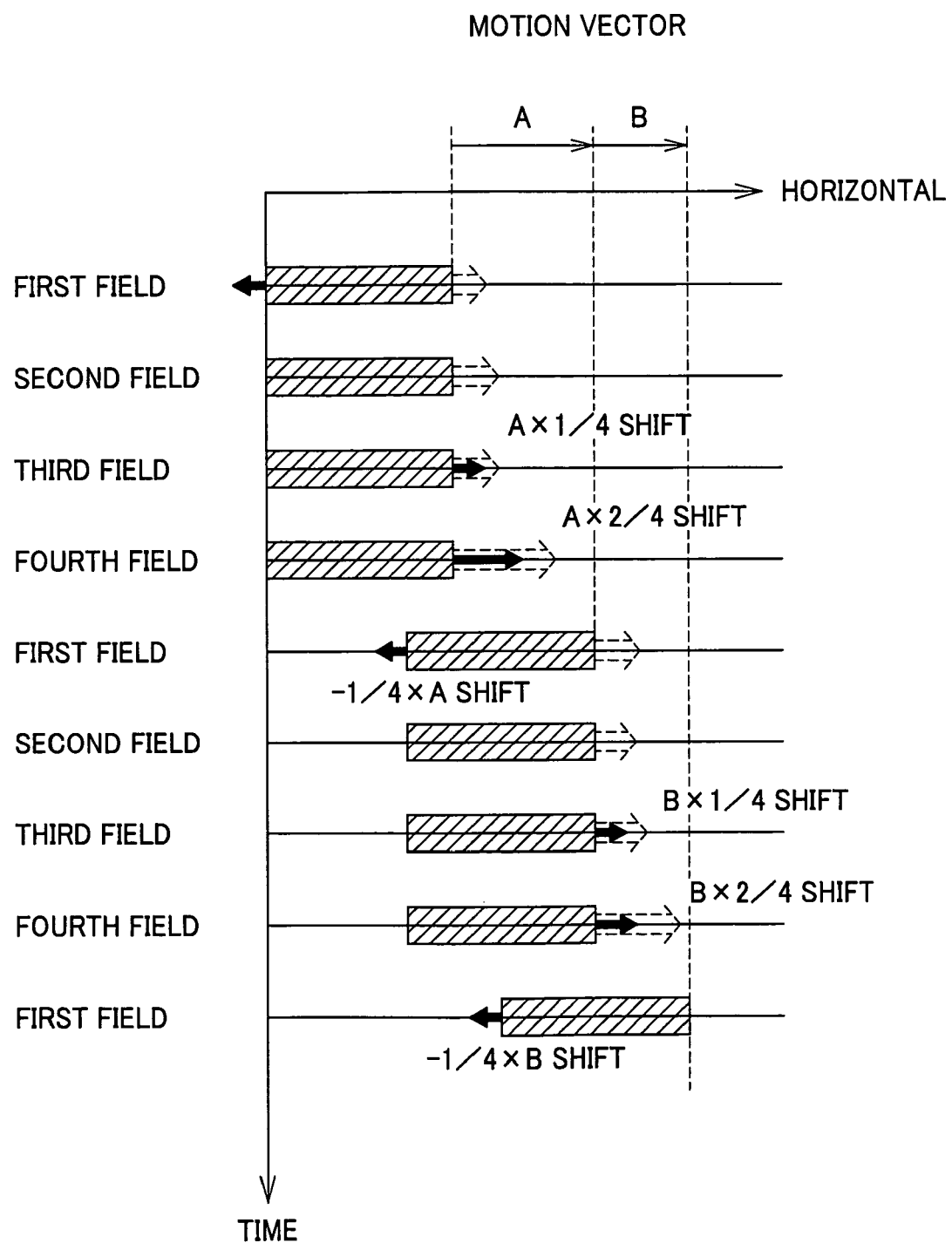
FIG. 9 is a view for explaining a method of shifting an image in each field.

Meanwhile, in the present invention in which images are shifted in the directions along the motion vectors and in the opposite direction of the motion vectors, balanced among the respective fields, the shift amount in the fourth field can be suppressed to be small as shown in FIG. 9. As a result of this, even if the direction of a detected motion vector is wrong when an image includes motions in two directions in one block, smooth motions can be realized without making this error conspicuous.

In the example shown in FIG. 9, the shift amount of each image can be increased by ¼ of the detected motion vector every time the field shifts after the second field, where the shift amount in the second field is 0. In this case, if the vector quantity is A, the shift amount in the second field is 0, the shift amount in the third field is A×¼, and the shift amount in the fourth field is A×²⁄₄. Further, in the first field in the next unit-frame, the shift amount can be set to ¼ of the motion vector A. Likewise, if the motion vector in the next unit-frame is B, the shift amount in the second field can be set to 0, the shift amount in the third field can be set to B×¼, and the shift amount in the fourth field can be set to B×²⁄₄.

By thus shifting the images, the shift amount can be increased linearly with respect to time, so that the motion of the image can be much smoother.

Figure 10:
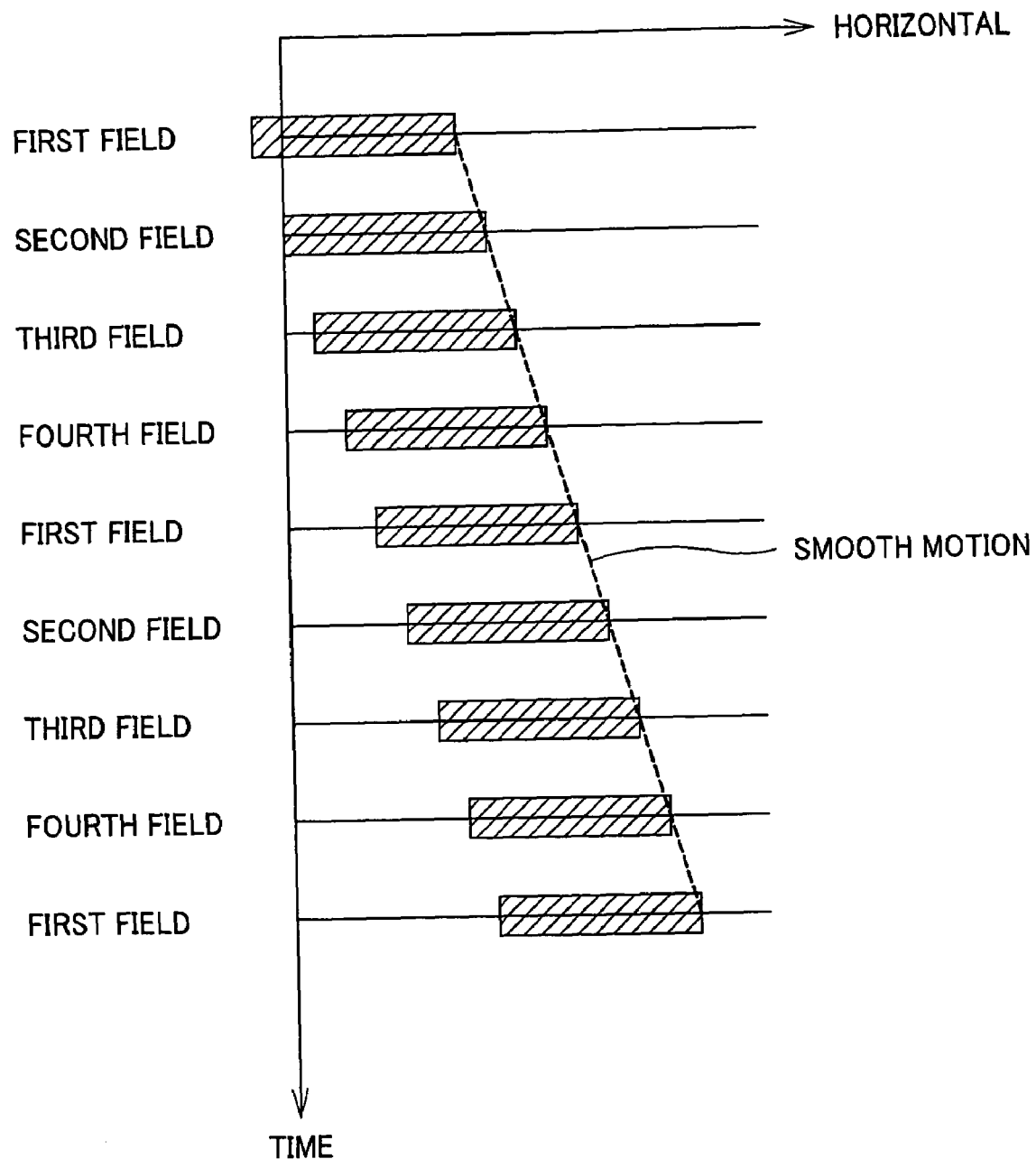
FIG. 10 is a view showing a result of shifting an image in each field.

FIG. 10 shows a result of shifting an image throughout the fields. The image moves gradually in the horizontal direction as the field shifts to a later field. That is, the image shifter 15 can disperse a shift amount equivalent to a motion vector to respective fields. As a result of this, the image can be moved smoothly without moving greatly when the fourth field shifts to the first field, compared with an image before the shifting.

Figure 11:
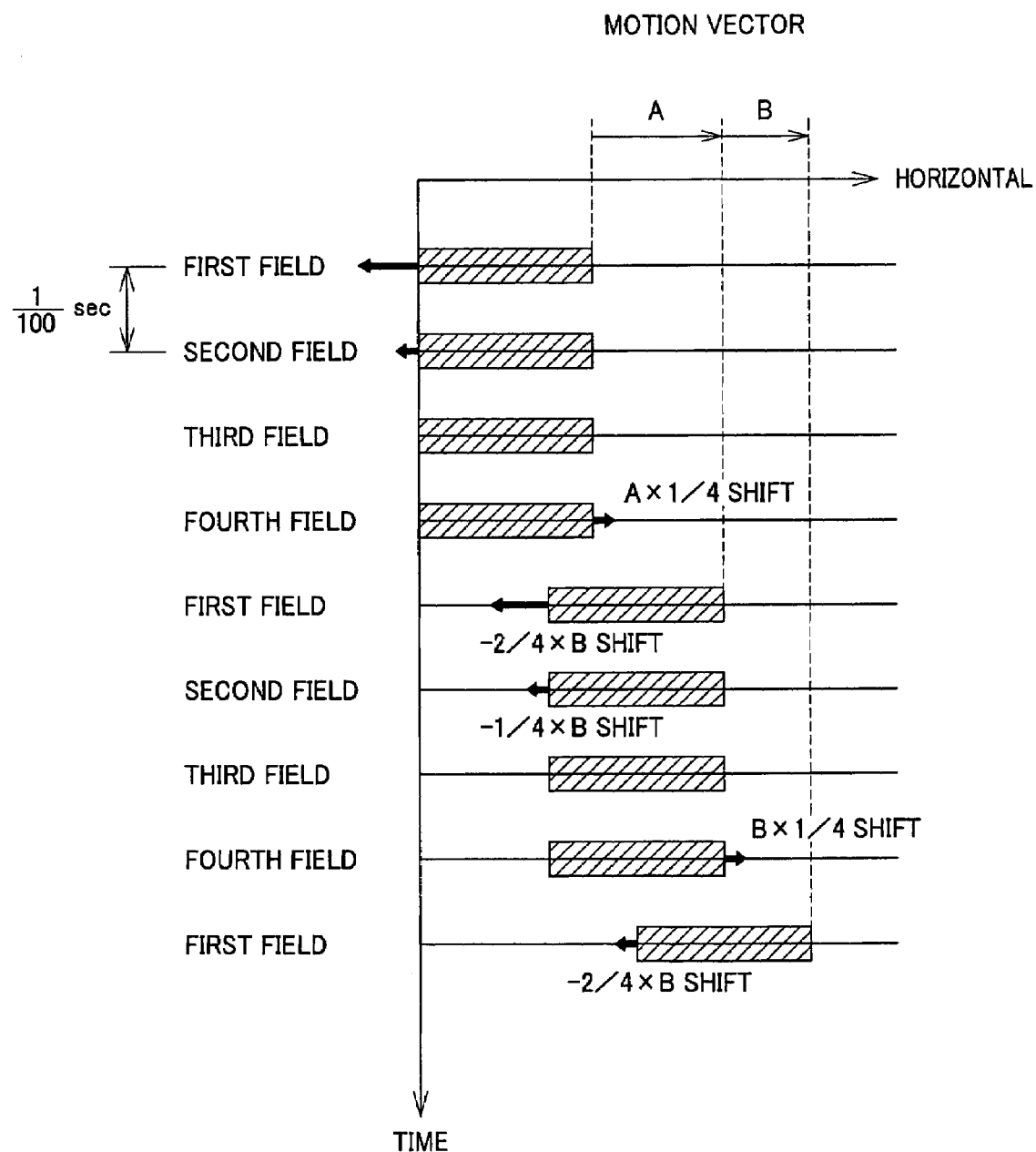
FIG. 11 is a view for explaining a method of shifting respective images in the first and second fields in the direction opposite to the motion vector.

Alternatively, the image shifter 15 can shift each image in the direction opposite to the motion vector in the first and second fields, and in the direction along the motion vector in the third and later fields, as shown in FIG. 11. In this case, in the first and second fields, the image is shifted such that the shift amount decreases gradually as the field shifts subsequently from the first field. In the third and fourth fields, the shift amount is increased gradually within the vector quantity of the motion vector as the field shifts subsequently from the third field, and is maximized in the fourth field. As a result of this, the images in the respective fields are shifted in different directions, like the example shown in FIG. 9, so that the shift amount per field can be suppressed and errors in detecting the motion vector can be reduced.

In the example shown in FIG. 11, the shift amount in the third field can be set to 0, and the shift amount of each image can be increased by ¼ of the detected motion vector every time the field shifts after the third field. In this case, if the vector quantity is A, the shift amount in the third field is 0, the image in the fourth field is shifted by A×¼. In the first field in the next unit-frame, the shift amount is set to ²⁄₄ of the motion vector A, and the shift amount in the second field is set to ¼. Likewise, if the motion vector B in the next unit-frame is B, the shift amount in the third field can be set to 0, and the shift amount in the fourth field can be set to B×¼.

Figure 12:
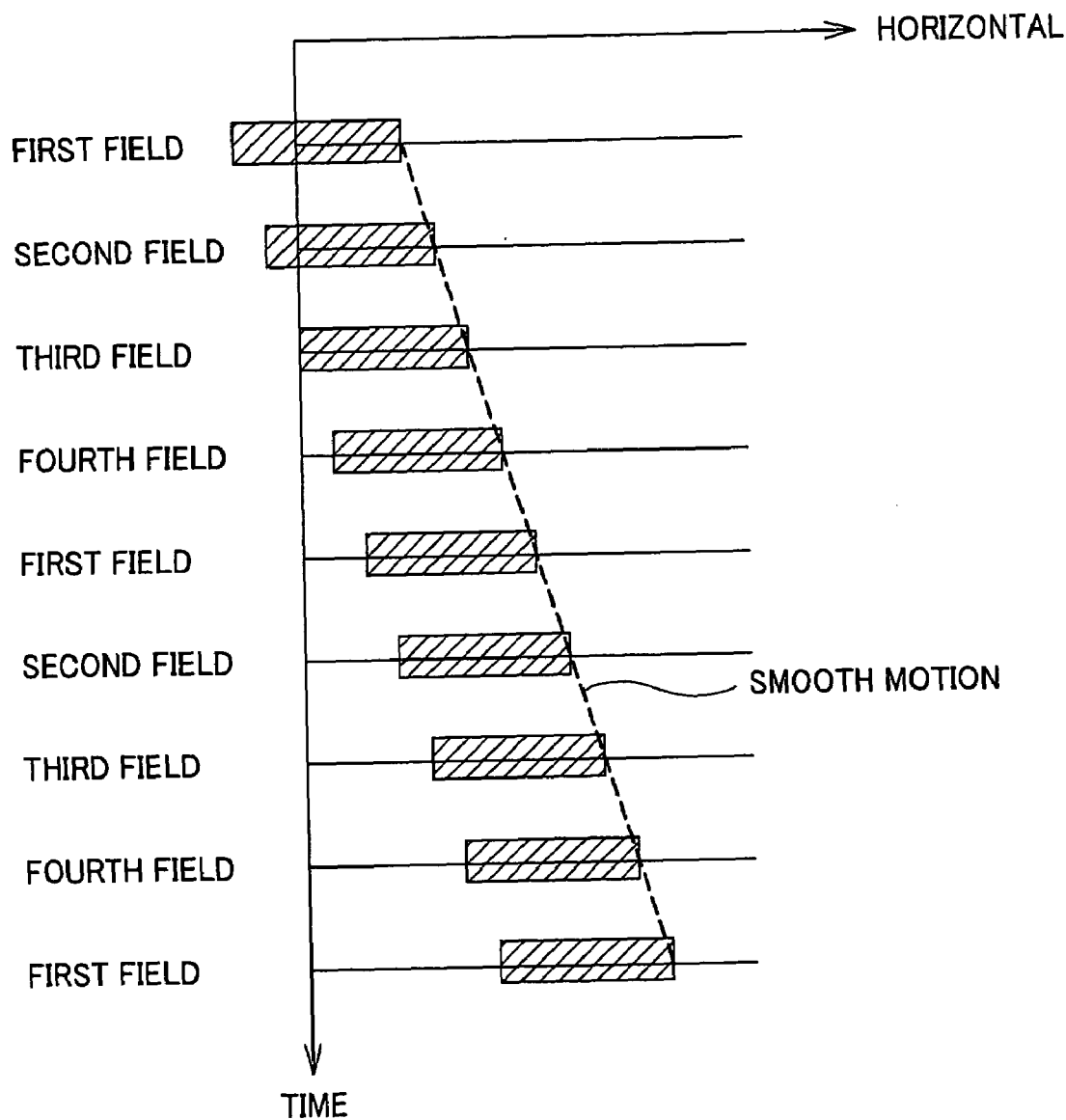
FIG. 12 is a view showing a result of shifting images according to the shifting method shown in FIG. 11.

FIG. 12 shows a result of shifting the images as shown in FIG. 11. Also in this FIG. 12, each image is moved gradually in the horizontal direction as the field shifts to a later field.

Further, in the image shifter 15, each image in the first to third fields can be shifted in the direction opposite to the motion vector, and the image in the fourth field can be shifted along the direction of the motion vector. In this case, each image is shifted such that the shift amount gradually decreases from the first field.

If the image signal processing apparatus 1 in which the double-speed field conversion circuit 3 is integrated is built in the television receiver, it is possible to eliminate discontinuity in motions which is specific to image signals subjected to double-speed conversion after telecine conversion. That is, in a variety of cases including the case that an image includes motions in two directions in one single block, and the like, the image signal processing apparatus 1 can improve the resolution by the double-speed field conversion circuit 3, suppress the screen flicker disturbance, and more smoothen the motion of each image.

Therefore, remarkable advantages can be obtained by the image signal processing apparatus 1 not only in case of sole practical use but also in practical use integrated with the double-speed field conversion circuit 3. In addition, version-up can be easily realized with respect to a television receiver which has already integrating the double-speed field conversion circuit, if the image signal processing apparatus 1 is built in later.

Figure 13:
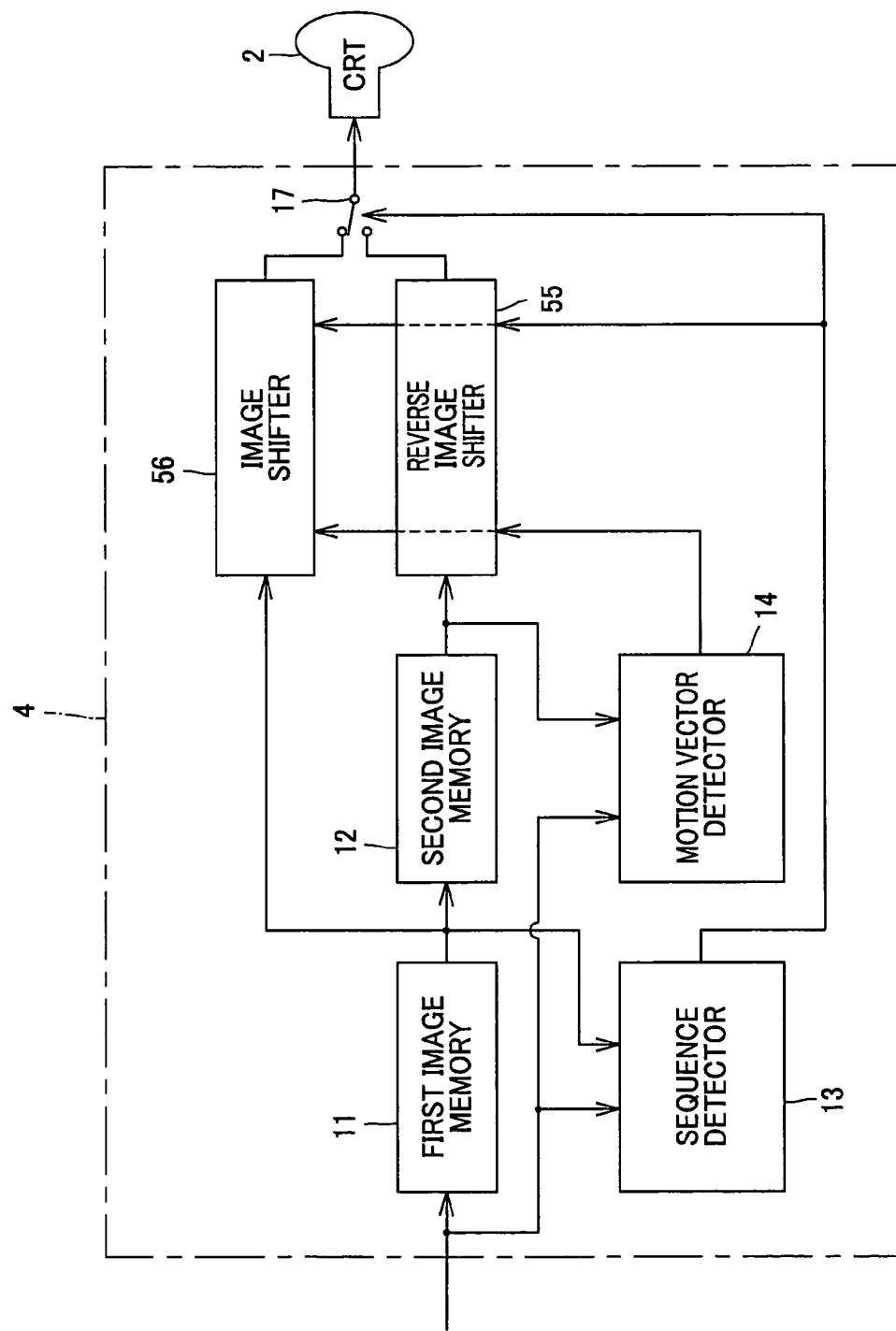
FIG. 13 is a block diagram showing the structure of an image signal processing apparatus which rearranges the order of fields forming a unit-frame, with respect to inputted image signals, and then outputs the signals to the CRT.

The image signal processing apparatus 1 according to the present invention is not limited to the embodiment described above. The present invention is applicable to an image signal processing apparatus 4 which rearranges the order of fields forming every unit-frame of inputted image signals and then outputs the signals to the CRT 2. FIG. 13 shows an example of the block structure of the image signal processing apparatus 4. The same components as those of the foregoing image signal processing apparatus 1 will be denoted at identical reference symbols, and detailed explanation thereof will be omitted herefrom.

The image signal processing apparatus 4 has a first image memory 11, a second image memory 12, a sequence detector 13, a motion vector 14, an image shifter 55, a reverse image shifter 56, and a switch 17.

The image shifter 55 receives results of comparing image signal levels, from the sequence detector 13. The image shifter 55 receives motion vectors detected by the motion vector 14. Further, the image sifter 55 shifts the pixel positions of image signals supplied from the second image memory 12, within the ranges of the vector quantities of the received motion vectors, and in the vector directions of the motion vectors. That is, the image shifter 55 shifts those image signals that are delayed by two frames from inputted image signals.

The reverse image shifter 56 receives the results of comparing pixel signal levels, from the sequence detector 13. The reverse image shifter 56 receives the motion vectors detected by the motion vector detector 14. Further, the reverse image shifter 56 shifts the pixel positions of image signals supplied to the first image memory 12, within the ranges of the vector quantities of the received motion vectors and in the directions opposite to the motion vectors. That is, the reverse image shifter 56 shifts those image signals that are the same as the inputted image signals and therefore have a time difference by two frames from the image signals shifted by the image shifter 55. In some cases, the reverse image shifter 56 is constructed to be integrated with the image shifter 55.

The image signals shifted by the image shifter 55 and the reverse image shifter 56 are both inputted to the switch 17. The switch 17 selects necessary image signals in units of fields, based on the result of comparing the pixel signal levels supplied from the sequence detector 13. The image signals selected by the switch 17 are outputted to the CRT 2.

Figure 14:
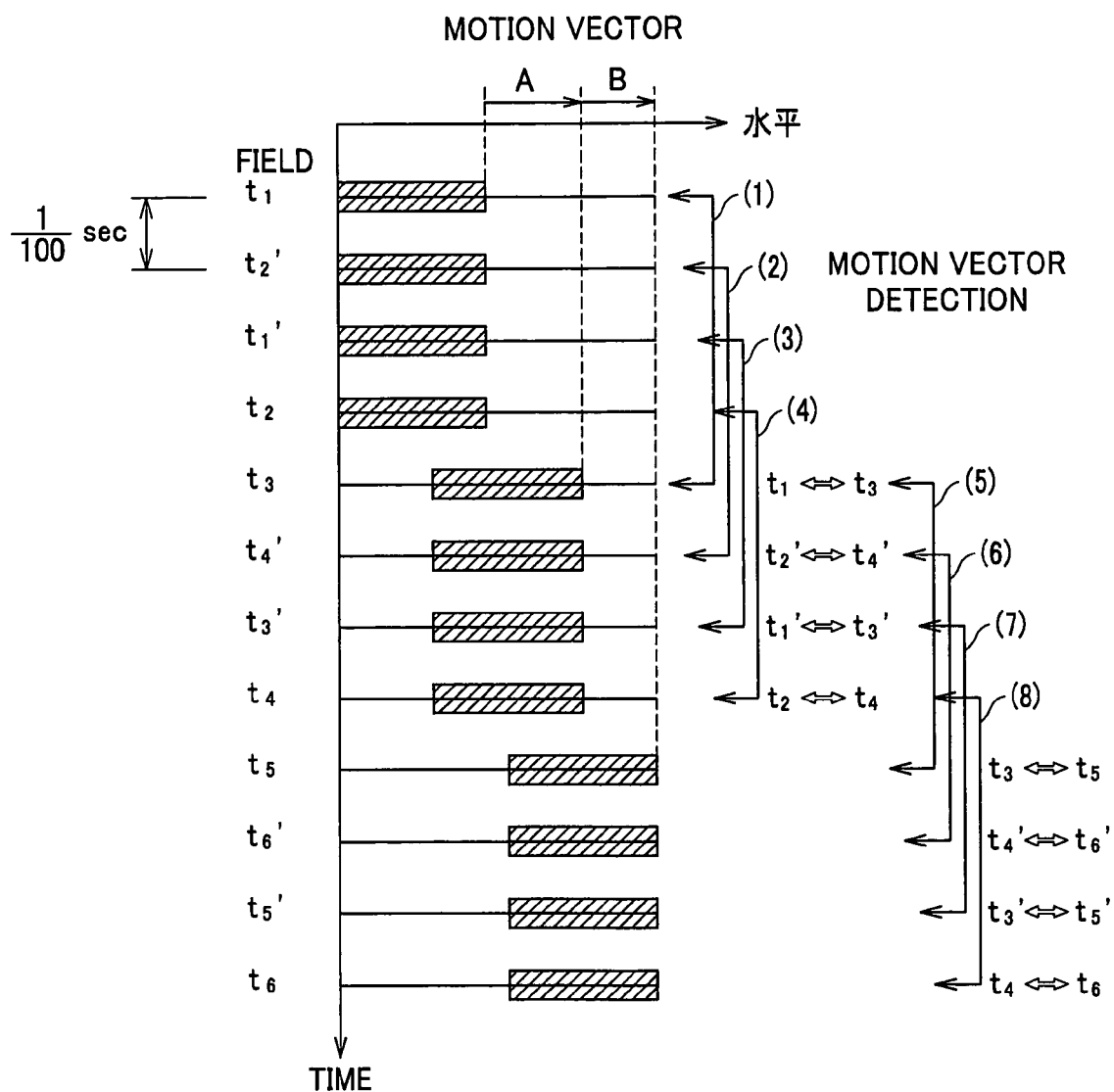
FIG. 14 is a view showing an example of the operation of the image signal processing apparatus which rearranges the order of fields forming a unit-frame and then outputs the signals.

Next, the operation of the image signal processing apparatus 4 to which the present invention is applied will be described with reference to FIG. 14.

The image signal processing apparatus 4 is sequentially inputted with image signals subjected to double-speed conversion after telecine conversion and consisting of unit-frames each formed of four fields, from the double-speed field conversion circuit 3. The image signal processing apparatus 4 specifies the first and second fields of the supplied image signals, delays these fields, based on the second image memory 12, and shifts the image signals in these fields in the vector directions of the motion vectors. Further, the image signal processing apparatus 4 specifies the third to fourth fields of the supplied image signals, and shifts the image signals in these fields in the directions opposite to the motion vectors, without delaying these fields.

The image signals supplied to the image signal processing apparatus 4 are arranged orderly at a predetermined time cycle, in the order of fields $t_1'$, $t_2'$, $t_1'$, and $t_2$. As the field shifts to $t_3$, the image moves to the position defined by a motion vector A, and the image signals are supplied to the image signal processing apparatus 4, in the order of fields $t_3$, $t_4'$, $t_3'$, and $t_4$. As the fields further shifts to $t_5$, the image then moves to the position defined by a motion vector B, and the image signals are supplied to the image signal processing apparatus 4, in the order of fields $t_5$, $t_6'$, $t_5'$, and $t_6$.

The motion vector detector 14 detects a motion vector at a cycle of every two frames, from the image signals inputted to the image signal processing apparatus 4. For example, when the field $t_1$ is outputted from the second image memory 12, the field $t_3$ which comes two frames behind the field $t_1$ is supplied to the first image memory 11. Therefore, the motion vector detector 14 firstly obtains a motion vector between the fields $t_1$ and $t_3$.

Next, when the field $t_2'$ is outputted from the second image memory 12, the field $t_4'$ is supplied to the first image memory. Therefore, a motion vector is detected between the fields $t_2'$ and $t_4'$. That is, the motion vector detector 14 sequentially detects motion vectors in the order of numbers written in the parentheses shown in FIG. 14.

A motion vector is detected in a time band (1), and thereafter, the image shifter 55 is inputted with the field $t_1$. The reverse image shifter 56 is inputted with the field $t_3$. The image shifter 55 shifts the image signal in the field $t_1$ in the vector direction or outputs this image signal to the switch 17 with the shift amount set to 0. The image signal in the field $t_3$ inputted to the reverse image shifter 56 is delayed by two frames and then shifted in the vector direction, thus performing no processing.

Likewise, a motion vector is detected in a time band (2), and thereafter, the image shifter 55 is inputted with the field $t_2'$. The image shifter 55 shifts the image signal in this field $t_2'$ in the vector direction, and then outputs the signal to the switch 17. The field $t_4'$ inputted to the reverse image shifter 56 is delayed by two frames, and thereafter, the image signal is shifted in the vector direction, thus performing no processing.

A motion vector is detected between the fields $t_1'$ and $t_3'$ in a time band (3), and thereafter, the field $t_1'$ is inputted to the image shifter 55. The reverse image shifter 56 is inputted with the field $t_3'$. In this case, the reverse image shifter 56 shifts the image signal in the inputted field $t_3'$, in the direction opposite to the motion vector. Note that the field $t_1'$ need not be processed since the image thereof is shifted by the reverse image shifter 56.

Similarly, in a time band (4), the inputted field $t_4$ is shifted in the direction opposite to the motion vector by the reverse image shifter 56.

Further, in a time band (5), a motion vector is detected between the fields $t_3$ and $t_5$, and thereafter, the image shifter 55 is inputted with the field $t_3$. The reverse image shifter 56 is inputted with the fields $t_5$. The image shifter shifts the image signal in the field $t_3$ in the vector direction or sets the shift amount to 0. Although this field $t_3$ has once been inputted to the reverse image shifter 56, no processing is performed by the reverse image shifter 56, so that one field might not be shifted repeatedly.

Similarly, in a time band (6), the image signal in the inputted field $t_4'$ is shifted in the direction along the motion vector by the image shifter 55.

As can be understood from the processing procedure as described above, the image signal processing apparatus 4 shifts alternately the image signals of the fields supplied to the image shifter 55 and the reverse image shifter 56, after detecting a motion vector.

Figure 15:
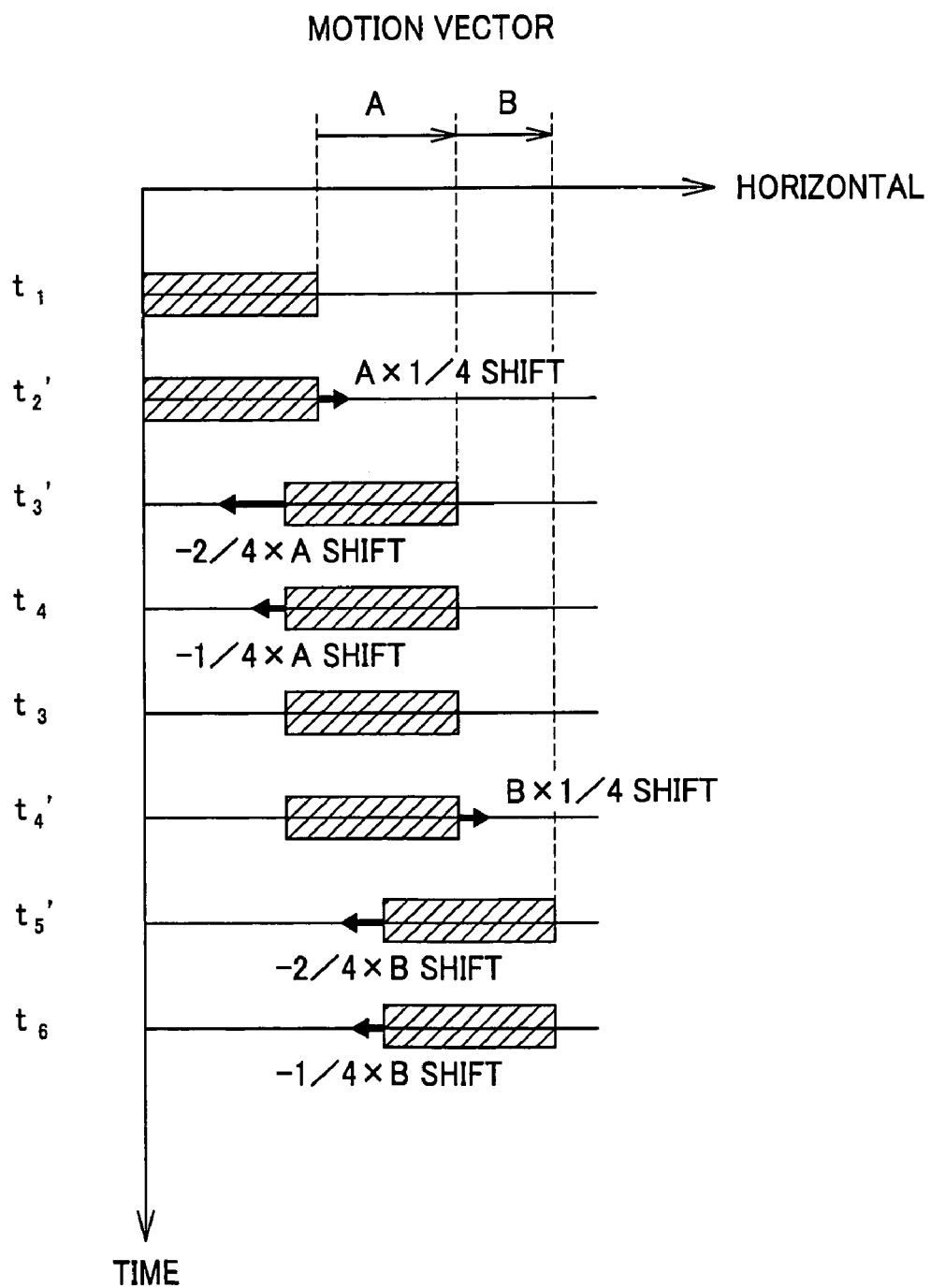
FIG. 15 is a view for explaining an example of the operation of the image signal processing apparatus shown in FIG. 14, where the order of fields forming a unit-frame is rearranged.

FIG. 15 shows a result of rearranging the fields in accordance with the shift amounts in the image signal processing apparatus 4. In FIG. 15, in the fields forming a unit-frame (e.g., the fields $t_3$, $t_4'$, $t_3'$, and $t_4$), the order of the input image signals is changed from that of the input image signals shown in FIG. 14. This suggests that whichever field starts shifting at first among the fields forming one unit-frame, one equal result can be obtained.

That is, the image signal processing apparatus 4 is capable of much more smoothening the images while suppressing the screen flicker disturbance, in images of wide variations such as a case where an image includes motions in two directions, in one single block, like the image signal processing apparatus 1 described previously.

In the example shown in FIG. 15, the shift amounts of the images can be arranged such that the shift amount of the field $t_1$ is set to 0 and the shift amount of the field $t_1'$ is set to ¼ of the vector quantity of the detected motion vector. Further, in the first field in the next unit-frame, the shift amount can be set to ¾ of the vector quantity A, and the shift amount in the second field can be set to ¼ of the vector quantity A. Likewise, if the motion vector in the next unit-frame is B, the shift amount of the third field can be set to 0, and the shift amount of the fourth field can be set to B×¼. As a result of this, the outputted image signals are the same as the example of shifted images shown in FIG. 15, so that the shift amount can linearly increase in accordance with time. Hence, motions of images can be much more smoothened.

The rearrangement of the fields is not limited to the example shown in FIG. 15. It is possible to set freely the vector directions and the vector quantities in and by which the image signals are shifted in the four fields forming one unit-frame (e.g., in the inputted image signals which are arranged in the order of fields $t_3$, $t_4'$, $t_3'$, and $t_4$).

Figure 16:
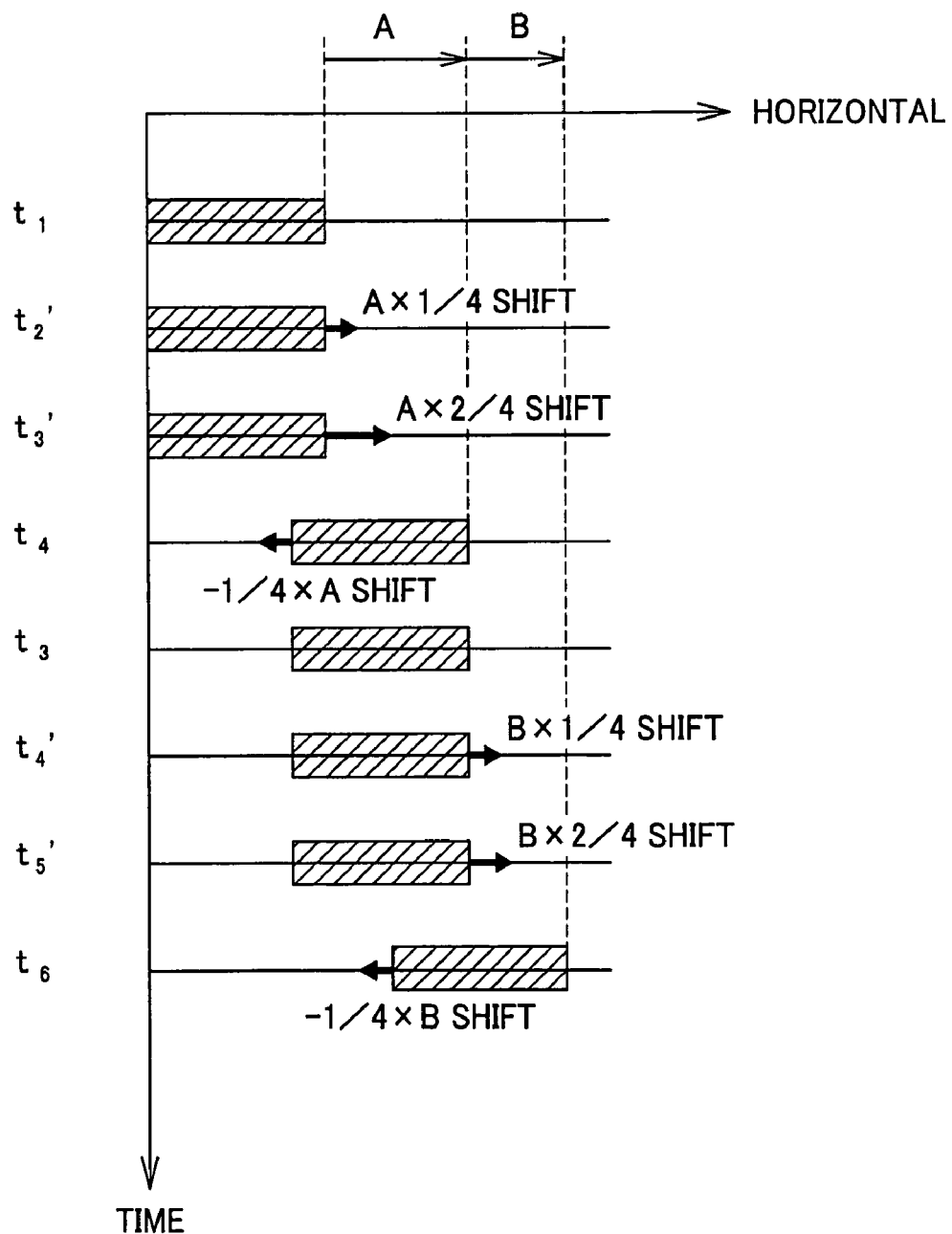
FIG. 16 is a view showing a second example of the operation of the image signal processing apparatus which rearranges the order of fields forming a unit-frame and then outputs the signals.

For example, as shown in FIG. 16, it is possible to shift the image signals such that the outputted image signals are arranged in the order of fields $t_4$, $t_3$, $t_4'$, and $t_3'$ in the horizontal direction. Further, it is possible to shift image signals such that the outputted image signals are arranged in the order of fields $t_3'$, $t_4$, $t_3$, and $t_4'$ in the horizontal direction, for example, as shown in FIG. 18.

Figure 17:
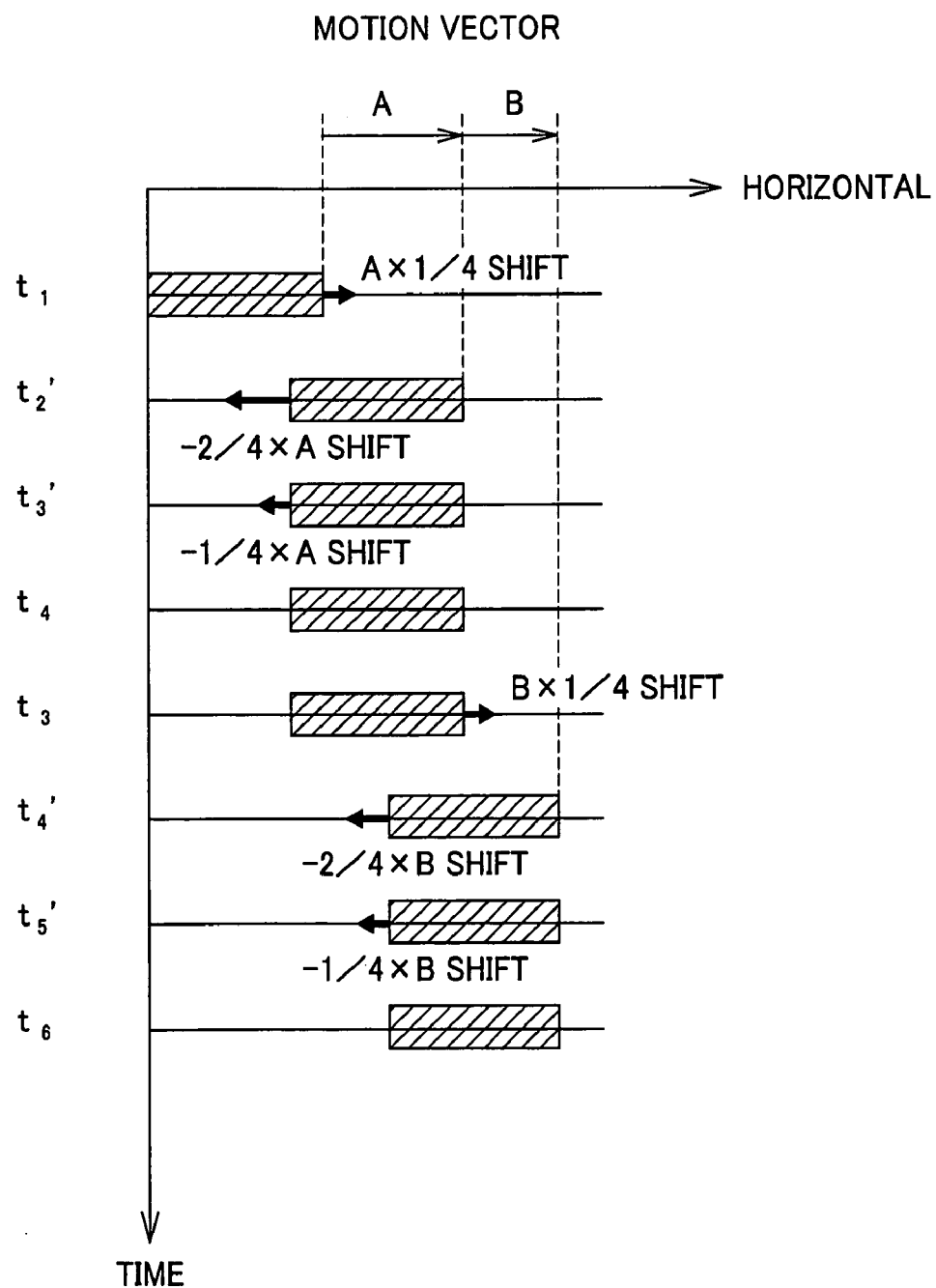
FIG. 17 is a view showing a third example of the operation of the image signal processing apparatus which rearranges the order of fields forming a unit-frame and then outputs the signals.
Figure 18:
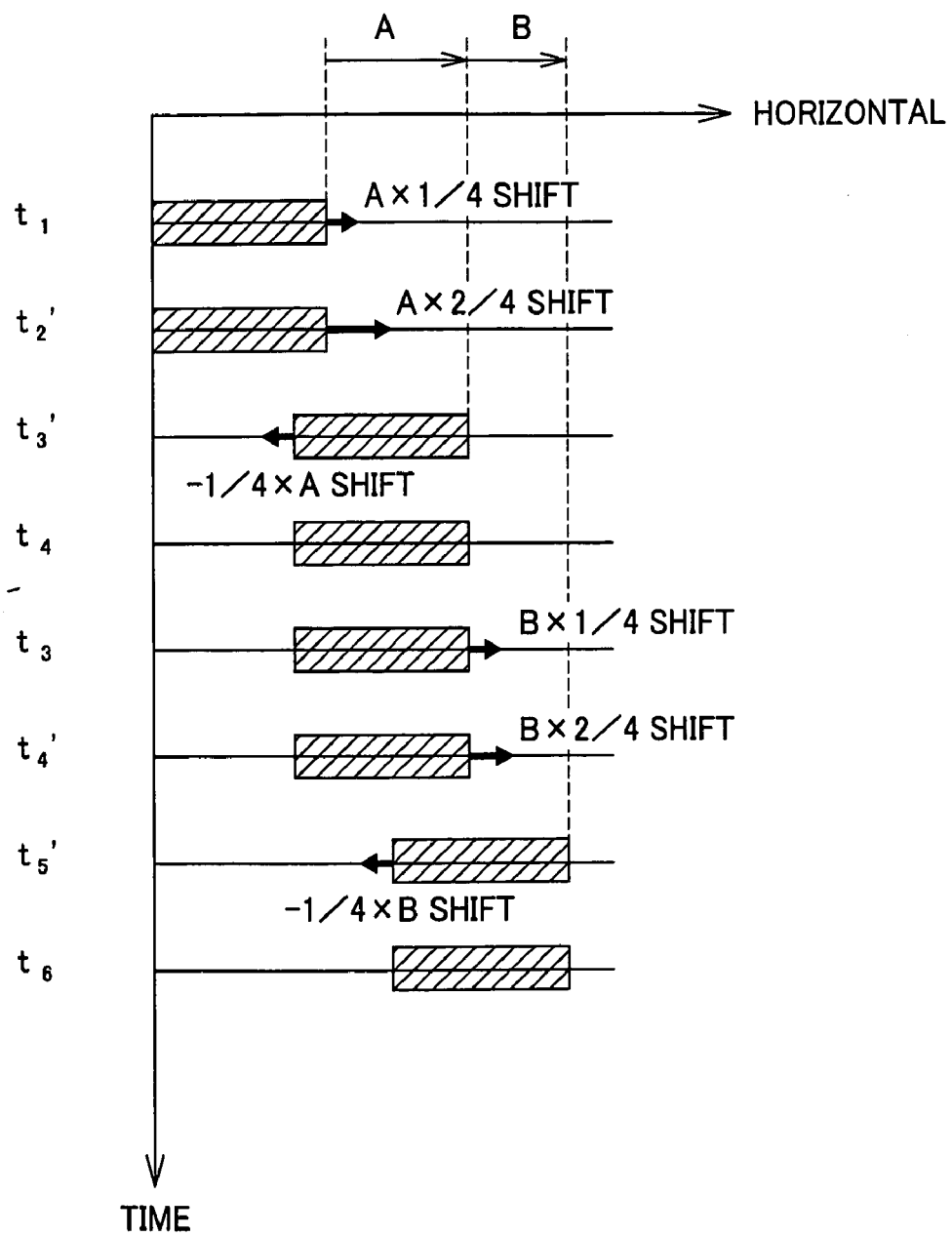
FIG. 18 is a view showing a fourth example of the operation of the image signal processing apparatus which rearranges the order of fields forming a unit-frame and then outputs the signals.

In the examples shown in FIGS. 16 to 18, if the shift amounts are increased and/or decreased in units of quarters of the vector quantity, the shift amount can be increased and/or decreased linearly in accordance with time, so that motions of images are much more improved.

The above image signal processing apparatuses to which the present invention is applied are not limited to the case of application to a television receiver according to the PAL system. For example, the present invention is applicable to a television receiver inputted with interlace image signals of 60 fields/second (30 unit-frames/second) according to NTSC (National TV System Committee). Alternatively, the present invention is applicable to a television receiver according to SECAM system.

Further, the image signal processing apparatuses according to the present invention are not limited to those built in television receivers but may be built in signal converters connected to television receivers.

The present invention is not limited to the embodiment described above with reference to the drawings but it would be obvious to the persons in the art that various modifications, substitutions, and equivalents of the present invention can be achieved without deviating from the scope and the subject matter of the appended claims.

INDUSTRIAL APPLICABILITY

As has been described above, according to the image signal processing apparatus and method, image signals which are generated by performing double-speed conversion on images subjected to telecine conversion and consist of unit-frames each formed of four fields are inputted, and the respective fields are specified on the basis of calculated difference values in pixel signal levels. The positions of detected pixels are shifted such that the pixel position in the first field thus specified is shifted in a direction opposite to a motion vector, the pixel position in the fourth field also specified is shifted in the motion vector, and the pixel positions in the second and third fields also specified are shifted to be gradually closer to the pixel position shifted in the fourth field as the fields come later from the first field.

As a result of this, the image signal processing apparatus and method according to the present invention are capable of smoothening motions of images while suppressing screen flicker disturbance with respect to images of wide variations, e.g., in the case that an image includes motions in two directions in one single block.

The invention claimed is:

1. An image signal processing apparatus inputted with an image signal which is generated by performing double-speed conversion on an image subjected to telecine conversion and which is formed of unit-frames each including four fields of first and successive second to fourth fields, each of the unit-frame starting from the first field, comprising:

a sequence detector which calculates a difference value in signal level between a detected pixel in a current field and a detected pixel at the same position in a field which comes one frame behind the current field, with respect to the inputted image signal, and specifies each of the fields forming the unit-frame, based on the difference value;

a motion vector detector which detects a motion vector for a field which comes two frames behind the current field, with respect to the detected pixel in the current field; and an image controller which shifts the positions of the detected pixels of the image signal within the fields specified by the sequence detector, respectively, in accordance with a vector quantity of the detected motion vector, wherein the image controller shifts the detected pixel, with respect to the specified first field, in a direction opposite to the motion vector, the image controller shifts the detected pixel, with respect to the specified fourth field, in a direction along the motion vector, and the image controller shifts the detected pixels, with respect to the specified second and third fields, so as to make the pixels gradually closer to the pixel position shifted with respect to the fourth field, in the consecutive order of the fields from the first field, in the direction along the motion vector or in the direction opposite to the motion vector.

2. The apparatus according to claim 1, wherein the image controller sets a shift amount of the second field to 0.

3. The apparatus according to claim 2, wherein every time a later field follows the second field, the shift amount is increased by ¼ of the vector quantity of the motion vector detected, and the shift amount of the first field is set to ¼ of the vector quantity of the motion vector based on a field which comes two frames before the current field.

4. The apparatus according to claim 1, wherein the image controller sets the shift amount of the third field to 0.

5. The apparatus according to claim 4, wherein the image controller sets the shift amount of the fourth field to ¼ of the vector quantity of the motion vector detected, sets the shift amount of the first field to ⅔ of the vector quantity of the motion vector based on the field which comes two frames before the current field, and sets the shift amount of the second field to ¼ of the vector quantity of the motion vector based on the field which comes two frames before the current field.

6. The apparatus according to claim 1, wherein if the difference value sequentially becomes 0, the sequence detector specifies the current field inputted earlier, as the first field.

7. The apparatus according to claim 1, wherein the motion vector detector detects the motion vector, based on a block matching method, for every block including a predetermined number of pixels.

8. The apparatus according to claim 1, wherein the inputted image signal is an interlace image signal according to PAL system.

9. An image signal processing method comprising the steps of:

inputting an image signal which is generated by performing double-speed conversion on an image subjected to telecine conversion and which is formed of unit-frames each including four fields of first and successive second to fourth fields, each of the unit-frame starting from the first field;

specifying each of the fields forming the unit-frame, with respect to the inputted image signal, based on a difference value calculated in signal level between a detected pixel in a current field and a detected pixel at the same position in a field which comes one frame behind the current field;

detecting a motion vector for a field which comes two frames behind the current field, with respect to the detected pixel in the current field;

shifting the detected pixel, with respect to the specified first field, in a direction opposite to the motion vector;

shifting the detected pixel, with respect to the specified fourth field, in a direction along the motion vector; and shifting the detected pixels, with respect to the specified second and third fields, so as to make the pixels gradually closer to the pixel position shifted with respect to the fourth field, in the consecutive order of the fields from the first field, in the direction along the motion vector or in the direction opposite to the motion vector.

10. The method according to claim 9, wherein a shift amount of the second field is set to 0.

11. The method according to claim 9, wherein every time a later field follows the second field, the shift amount is increased by ¼ of the vector quantity of the motion vector detected, and the shift amount of the first field is set to ¼ of the vector quantity of the motion vector based on a field which comes two frames before the current field.

12. The method according to claim 9, wherein the shift amount of the third field is set to 0.

13. The method according to claim 12, wherein the shift amount of the fourth field is set to ¼ of the vector quantity of the motion vector detected, the shift amount of the first field is set to ⅔ of the vector quantity of the motion vector based on the field which comes two frames before the current field, and the shift amount of the second field is set to ¼ of the vector quantity of the motion vector based on the field which comes two frames before the current field.

14. The method according to claim 9, wherein if the difference value sequentially becomes 0, specifying the current field inputted earlier, as the first field.

15. The method according to claim 9, wherein the motion vector is detected, based on a block matching method, for every block including a predetermined number of pixels.

16. The method according to claim 9, wherein an interlace image signal according to PAL system having a field frequency converted to a double frequency of 100 fields/second from 50 fields/second is inputted as the image signal.

* * * * *